US011964493B2

(12) United States Patent
Yokoyama

(10) Patent No.: US 11,964,493 B2
(45) Date of Patent: Apr. 23, 2024

(54) LIQUID EJECTING APPARATUS AND CONTROL METHOD OF LIQUID EJECTING APPARATUS

(71) Applicant: Seiko Epson Corporation, Tokyo (JP)

(72) Inventor: Taichi Yokoyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 188 days.

(21) Appl. No.: 17/651,195

(22) Filed: Feb. 15, 2022

(65) Prior Publication Data

US 2022/0258483 A1 Aug. 18, 2022

(30) Foreign Application Priority Data

Feb. 18, 2021 (JP) ................................ 2021-024015

(51) Int. Cl.
*B41J 2/175* (2006.01)
*B41J 2/19* (2006.01)

(52) U.S. Cl.
CPC ....... *B41J 2/17563* (2013.01); *B41J 2/17596* (2013.01); *B41J 2/19* (2013.01)

(58) Field of Classification Search
CPC ...... B41J 2/17563; B41J 2/17596; B41J 2/19; B41J 2/18; B41J 2/145
See application file for complete search history.

(56) References Cited

U.S. PATENT DOCUMENTS

2018/0361751 A1* 12/2018 Shinoda .................. B41J 2/175
2019/0001687 A1 1/2019 Sato et al.

FOREIGN PATENT DOCUMENTS

JP 2016-013696 1/2016
JP 2018-187882 11/2018
JP 2019-010860 1/2019
WO 2011-143698 11/2011

* cited by examiner

*Primary Examiner* — Bradley W Thies
(74) *Attorney, Agent, or Firm* — WORKMAN NYDEGGER

(57) ABSTRACT

A liquid ejecting apparatus includes a head unit having a plurality of nozzles ejecting an ink, the head unit including a filter provided with holes through which the ink can pass, a first nozzle row formed by the plurality of nozzles, and a second nozzle row formed by the plurality of nozzles, and a mounting portion on which the head unit is detachably mounted. The nozzles forming the second nozzle row communicate with the nozzles forming the first nozzle row via the filter. A pre-operation of forming gas-liquid interfaces in the holes provided in the filter is executed before the head unit is removed from the mounting portion.

8 Claims, 13 Drawing Sheets

LIQUID EJECTING APPARATUS AND CONTROL METHOD OF LIQUID EJECTING APPARATUS

The present application is based on, and claims priority from JP Application Serial Number 2021-024015, filed Feb. 18, 2021, the disclosure of which is hereby incorporated by reference herein in its entirety.

BACKGROUND

1. Technical Field

The present disclosure relates to a liquid ejecting apparatus and a control method of a liquid ejecting apparatus.

2. Related Art

JP-A-2019-10860 discloses an ink jet printer that is an example of a liquid ejecting apparatus performing printing by ejecting an ink, which is an example of a liquid, on a medium. The printer includes a liquid discharging head that is an example of a head unit and a mounting portion on which the liquid discharging head is detachably mounted. The liquid discharging head has a plurality of nozzle rows that are an example of a nozzle group formed by a plurality of nozzles ejecting an ink. In addition, the plurality of nozzle rows communicate with each other via a flow path in the liquid discharging head.

However, in the liquid ejecting apparatus described in JP-A-2019-10860, the posture of the head unit changes, for example, by removing the head unit from the mounting portion, and a height difference between the plurality of nozzles occurs in some cases. In this case, the pressure of an ink in the head unit caused by the height difference between the plurality of nozzles acts on gas-liquid interfaces formed in the nozzles by the ink, and thus there is a possibility that the gas-liquid interfaces in the nozzles are broken and an ink leakage occurs.

SUMMARY

According to an aspect of the present disclosure, there is provided a liquid ejecting apparatus including a head unit having a plurality of nozzles ejecting a liquid, a filter provided with a hole through which the liquid is configured to pass, a filter chamber including an upstream chamber and a downstream chamber, which are partitioned by the filter, a first nozzle group formed by a plurality of the nozzles, and a second nozzle group formed by a plurality of the nozzles, a mounting portion on which the head unit is detachably mounted, a gas introduction unit configured to introduce a gas into the filter chamber, and a control unit, in which the nozzles forming the second nozzle group communicate with the nozzles forming the first nozzle group via the filter of the filter chamber, when a pressure difference between a pressure on a gas side and a pressure on a liquid side, at which a gas-liquid interface formed in the hole of the filter is able to be maintained, is defined as a withstand pressure Pf and a pressure difference between a pressure on the gas side and a pressure on the liquid side, at which a gas-liquid interface formed in the nozzle is able to be maintained, is defined as a withstand pressure Pn, the withstand pressure Pf is greater than the withstand pressure Pn, and the control unit executes, before the head unit is removed from the mounting portion, a pre-operation of forming the gas-liquid interface in the hole provided in the filter by controlling the gas introduction unit and introducing the gas into the filter chamber.

According to another aspect of the present disclosure, there is provided a control method of a liquid ejecting apparatus including a head unit having a plurality of nozzles ejecting a liquid, a filter provided with a hole through which the liquid is configured to pass, a first nozzle group formed by a plurality of the nozzles, and a second nozzle group formed by a plurality of the nozzles, and a mounting portion on which the head unit is detachably mounted, in which the nozzles forming the second nozzle group communicate with the nozzles forming the first nozzle group via the filter, and when a pressure difference between a pressure on a gas side and a pressure on a liquid side, at which a gas-liquid interface formed in the hole of the filter is able to be maintained, is defined as a withstand pressure Pf and a pressure difference between the pressure on the gas side and the pressure on the liquid side, at which a gas-liquid interface formed in the nozzle is able to be maintained, is defined as a withstand pressure Pn, the withstand pressure Pf is greater than the withstand pressure Pn, the control method of a liquid ejecting apparatus including executing, before the head unit is removed from the mounting portion, a pre-operation of forming the gas-liquid interface in the hole provided in the filter.

DESCRIPTION OF EXEMPLARY EMBODIMENTS

Hereinafter, the present disclosure will be described based on embodiments. The same members will be assigned with the same reference signs in each drawing, and redundant description will be omitted.

In addition, in each drawing, X, Y, and Z represent three spatial axes orthogonal to each other. In the present specification, directions along the axes are an X-axis direction, a Y-axis direction, and a Z-axis direction. When specifying directions, a positive/negative sign will be used together with direction notation with a positive direction written as "+", and a negative direction written as "−", and description will be made with a direction in which an arrow in each drawing is directed written as a +direction and an opposite direction of the arrow written as a −direction. In addition, a Z direction indicates a vertical direction, a +Z direction indicates a vertically downward direction, and a −Z direction indicates a vertically upward direction. Further, description will be made with the three spatial axes including X, Y, and Z, which do not limit a positive direction and a negative direction, as an X-axis, a Y-axis, and a Z-axis.

1. Embodiment 1

In the present embodiment, a liquid ejecting apparatus 500 is configured as an ink jet printer, and forms an image by ejecting an ink on printing paper P. The ink is an example of a liquid. Instead of the printing paper P, any type of medium such as a resin film and fabric may be used as an ink discharge target.

Figure 1:
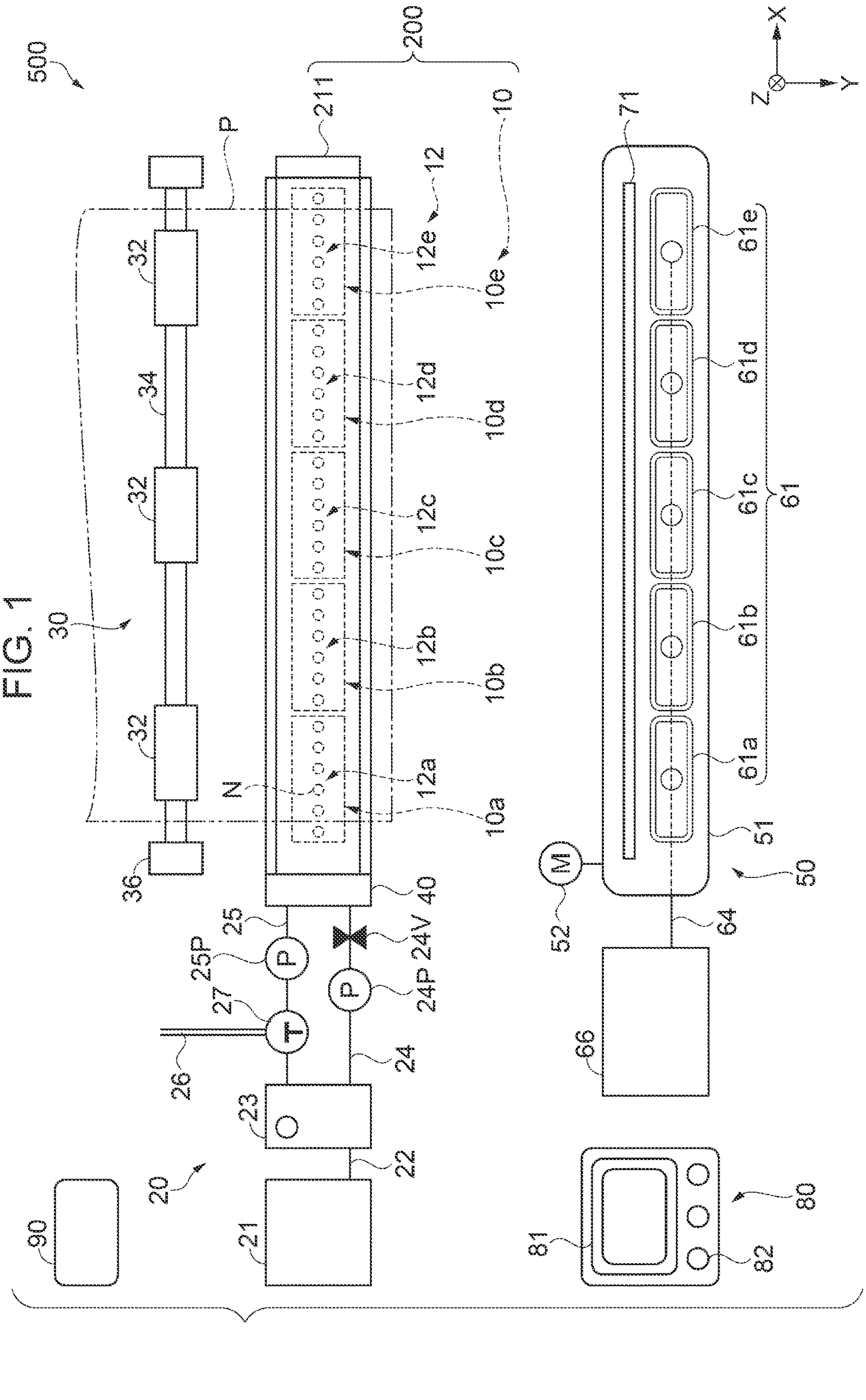
FIG. 1 is a block diagram showing a schematic configuration of a liquid ejecting apparatus including a head unit which is an embodiment of the present disclosure.

As shown in FIG. 1, the liquid ejecting apparatus 500 includes a head unit 200, a fluid flowing unit 20, a transport mechanism 30, a mounting portion 40, a maintenance unit 50, an input/output unit 80, and a control unit 90.

As shown in FIGS. 1 to 3B, the head unit 200 has a flow path portion 211 and a liquid ejecting head 10. As the head unit 200 is mounted on the mounting portion 40, the flow path portion 211 is provided with a common flow path 224 through which an ink is supplied from a liquid flow path 24 of the fluid flowing unit 20, which is to be described later, can be supplied to the liquid ejecting head 10 and a second common flow path 225 through which the ink to be discharged from the liquid ejecting head 10 is discharged to a fluid flow path 25. The common flow path 224 has a common flow path side coupling portion 224C that can communicate with a liquid flow path side coupling portion 24C included in the liquid flow path 24.

In the common flow path side coupling portion 224C, an opening/closing valve that brings the common flow path 224 into a communication state with the liquid flow path 24 as the head unit 200 is mounted on the mounting portion 40, and blocks communication with the outside of the common flow path side coupling portion 224C as the head unit 200 is removed from the mounting portion 40 is provided. The second common flow path 225 has a second common flow path side coupling portion 225C that can communicate with a fluid flow path side coupling portion 25C included in the fluid flow path 25. In the second common flow path side coupling portion 225C, an opening/closing valve that brings the second common flow path 225 into a communication state with the fluid flow path 25 as the head unit 200 is mounted on the mounting portion 40, and blocks communication with the outside of the second common flow path side coupling portion 225C as the head unit 200 is removed from the mounting portion 40 is provided.

The liquid ejecting head 10 has a plurality of nozzles N ejecting an ink. The plurality of nozzles N form a nozzle row 12 by being arranged at equal intervals in one direction. In a state where the head unit 200 is attached to the mounting portion 40 to be described later, the nozzle row 12 follows the X-axis direction, a dimension between the nozzles N at both ends in the X-axis direction, among the plurality of nozzles N forming the nozzle row 12, is longer than a width dimension of the printing paper P. The nozzle row 12 is an example of a nozzle group.

The head unit 200 of the present embodiment is a so-called line head that forms an image on the printing paper P by ejecting an ink in a +Z direction from the plurality of nozzles N configuring the nozzle row 12. Although one color of a black ink is given as an example of the ejected ink in the head unit 200 of the present embodiment, four nozzle rows 12 may be provided at intervals in the Y-axis direction in the head unit 200, and different inks, for example, in total, four colors of inks, such as black, cyan, magenta, and yellow may be ejected from each of the nozzle rows 12.

The liquid ejecting head 10 in the present embodiment is configured by a plurality of liquid ejecting heads 10*a*, 10*b*, 10*c*, 10*d*, and 10*e*. The liquid ejecting head 10 has a nozzle surface 11. The nozzle surface 11 is configured by nozzle surfaces 11*a*, 11*b*, 11*c*, 11*d*, and 11*e*. The liquid ejecting heads 10*a*, 10*b*, 10*c*, 10*d*, and 10*e* has the nozzle surfaces 11*a*, 11*b*, 11*c*, 11*d*, and 11*e*, respectively. Nozzle rows 12*a*, 12*b*, 12*c*, 12*d*, and 12*e* formed by arranging the plurality of nozzles N in one direction are provided on the nozzle surfaces 11*a*, 11*b*, 11*c*, 11*d*, and 11*e*, respectively. The nozzle row 12 in the present embodiment is configured by the nozzle rows 12*a*, 12*b*, 12*c*, 12*d*, and 12*e*. The nozzle row 12*a* is an example of a first nozzle group, the nozzle row 12*e* is an example of a second nozzle group, and the nozzle row 12*c* is an example of a third nozzle group.

Although the head unit 200 is formed by attaching the plurality of liquid ejecting heads 10*a*, 10*b*, 10*c*, 10*d*, and 10*e* to the flow path portion 211 such that the plurality of nozzle rows 12*a*, 12*b*, 12*c*, 12*d*, and 12*e* form one nozzle row 12 in the present embodiment, the head unit 200 may be formed by attaching one liquid ejecting head 10 having one nozzle row 12 formed by the plurality of nozzle rows 12*a*, 12*b*, 12*c*, 12*d*, and 12*e* to the flow path portion 211. Alternatively, the head unit 200 may be in a form in which one liquid ejecting head 10 having one nozzle row 12 formed by the plurality of nozzle rows 12*a*, 12*b*, 12*c*, 12*d*, and 12*e* integrally includes the flow path portion 211.

The liquid ejecting head 10 has a filter chamber 17. The filter chamber 17 includes a filter 16 that can filter an ink and an upstream chamber 17U and a downstream chamber 17D, which are partitioned by the filter 16. A plurality of holes 16H through which a fluid including the ink can pass are provided in the filter 16. The upstream chamber 17U is provided with a first filter flow path 18 that makes the upstream chamber 17U communicate with the common flow path 224 and a second filter flow path 19 that makes the upstream chamber 17U communicate with the second common flow path 225. The filter chamber 17 includes a plurality of filter chambers 17*a*, 17*b*, 17*c*, 17*d*, and 17*e*. In the present embodiment, the liquid ejecting head 10*a* has the filter chamber 17*a*, the liquid ejecting head 10*b* has the filter chamber 17*b*, the liquid ejecting head 10*c* has the filter chamber 17*c*, the liquid ejecting head 10*d* has the filter chamber 17*d*, and the liquid ejecting head 10*e* has the filter chamber 17*e*.

The filter chamber 17*a* is an example of a first filter chamber, the upstream chamber 17U included in the filter chamber 17_a_ is an example of a first upstream chamber, and the downstream chamber 17D included in the filter chamber 17_a_ is an example of a first downstream chamber. The filter chamber 17_e_ is an example of a second filter chamber, the upstream chamber 17U included in the filter chamber 17_e_ is an example of a second upstream chamber, and the downstream chamber 17D included in the filter chamber 17_e_ is an example of a second downstream chamber. The filter chamber 17_c_ is an example of a third filter chamber, the upstream chamber 17U included in the filter chamber 17_c_ is an example of a third upstream chamber, and the downstream chamber 17D included in the filter chamber 17_c_ is an example of a third downstream chamber.

For example, a mesh-shaped body, a porous body, and a perforated plate in which fine through-holes are formed can be used as the filter 16. Examples of the mesh-shaped filter include wire mesh, resin mesh, a mesh filter, and metal fiber. Examples of the metal fiber filter include a felt filter obtained by making a stainless steel fine wire into a felt shape and a metal sintered filter obtained by compression-sintering a stainless steel fine wire. Examples of the perforated plate filter include an electroforming metal filter, an electron beam processed metal filter, and a laser beam processed metal filter.

The filter 16 is provided with the multiple holes 16H through which a fluid can pass, and collects foreign substances. A filtration particle size indicating the size of the foreign substance that can be collected by the filter 16 is preferably smaller than a minimum dimension of the nozzle N, for example, the dimension of a nozzle opening of the nozzle N, which is open to the nozzle surface 11. Accordingly, it can be difficult for foreign substances in an ink to reach the nozzles N. The minimum dimension of the nozzle opening is the diameter of the nozzle opening when the nozzle opening is a circle.

Herein, gas-liquid interfaces formed in the holes 16H of the filter 16 in the present embodiment by the atmosphere and an ink and gas-liquid interfaces formed in the nozzles N included in the head unit 200 by the atmosphere and the ink will be compared to each other. When a pressure difference between a pressure on an ink side, at which the gas-liquid interfaces formed in the holes 16H of the filter 16 can be maintained, and a pressure on an atmosphere side is defined as a withstand pressure Pf and a pressure difference between a pressure on the ink side, at which the gas-liquid interfaces formed in the nozzles N can be maintained, and a pressure on the atmosphere side is defined as a withstand pressure Pn, the withstand pressure Pf is greater than the withstand pressure Pn. That is, the specifications of the holes 16H of the filter 16 in the present embodiment are set such that the withstand pressure Pf is greater than the withstand pressure Pn. The atmosphere is an example of a gas, and refers to the air of the earth. The withstand pressure Pf in the present embodiment is, for example, 5.5 kPa, and the withstand pressure Pn is, for example, 3.5 kPa.

In addition, when a maximum pressure among pressures of an ink in the head unit 200, which are caused by a height difference between the plurality of nozzles N included in the head unit 200 and act on the gas-liquid interfaces formed in the nozzles N, is defined as a pressure Ph1, the specifications of the holes 16H of the filter 16 are set such that the withstand pressure Pf is greater than the pressure Ph1. For example, when the posture of the head unit 200 is tilted with respect to a posture shown in FIGS. 1 to 3A by removing the head unit 200 from the mounting portion 40, a height difference between the plurality of nozzles N configuring the nozzle row 12 occurs. In this case, the pressure of an ink in the head unit 200 caused by the height difference between the plurality of nozzles N included in the head unit 200 acts on the gas-liquid interfaces formed in the nozzles N by the ink.

Figure 2:
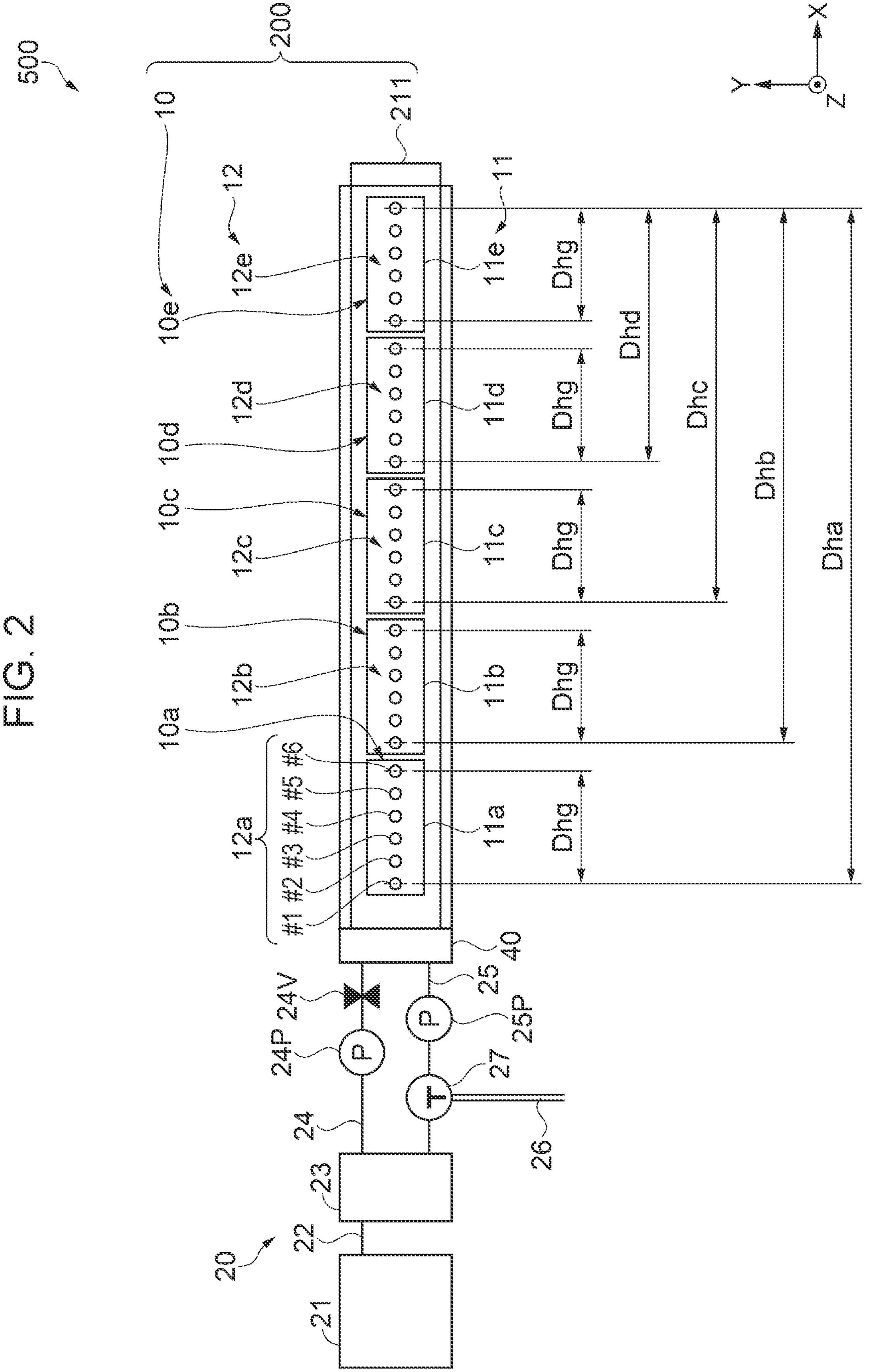
FIG. 2 is a view showing a configuration around the head unit.
Figure 3A:
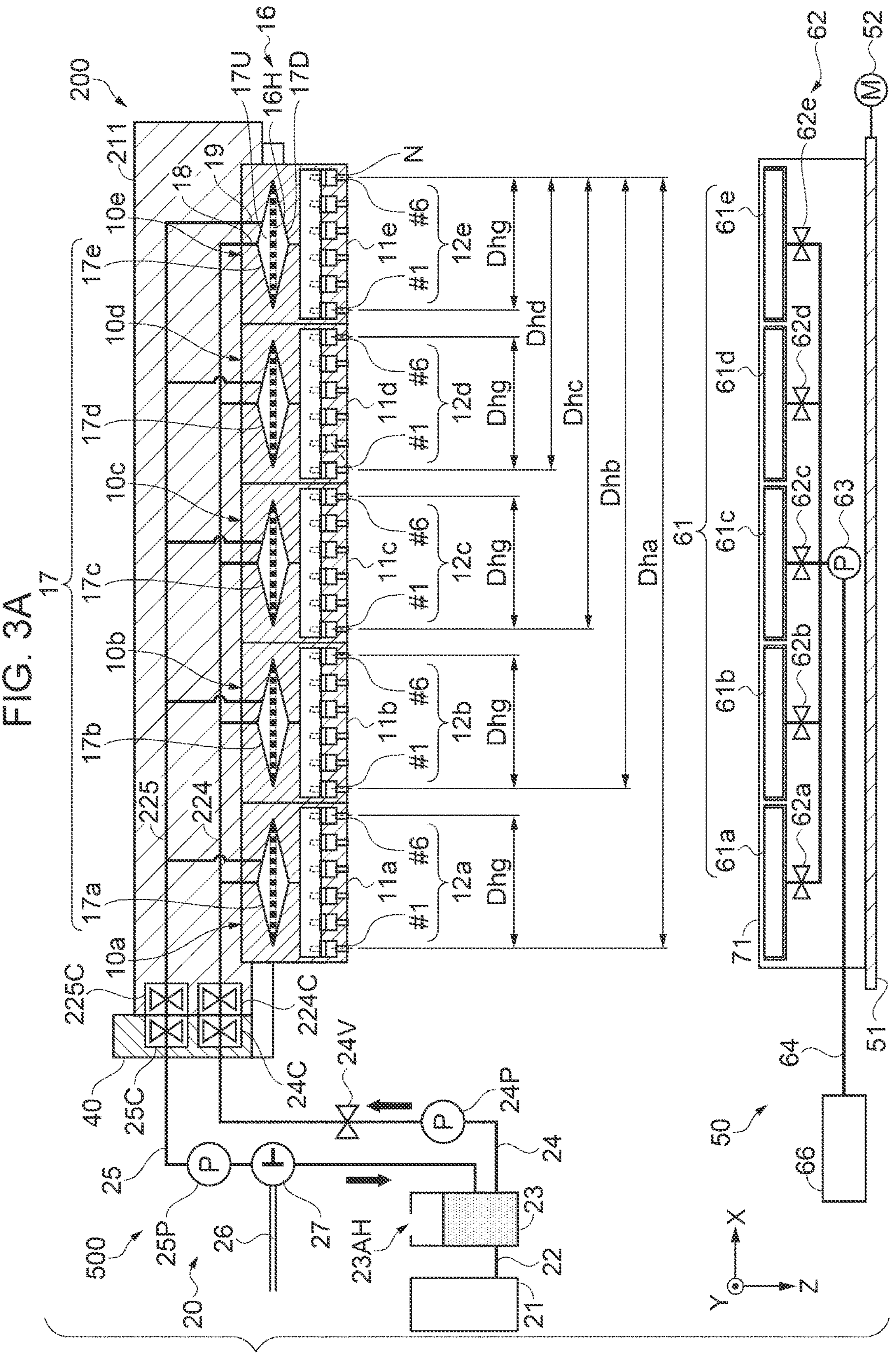
FIG. 3A is a cross sectional view showing a detailed configuration of the liquid ejecting apparatus.

In the present embodiment, when the posture of the head unit 200 is in the Z-axis direction in which a direction in which the plurality of nozzles N configuring the nozzle row 12 are arranged is the vertical direction, the pressure of an ink in the head unit 200, which acts on each of the nozzles N, is maximum. As shown in FIGS. 2 and 3A, the plurality of nozzles N forming each of the nozzle rows 12_a_, 12_b_, 12_c_, 12_d_, and 12_e_ configuring the nozzle row 12 included in the liquid ejecting head 10 will be referred to as nozzle #1, nozzle #2, nozzle #3, nozzle #4, nozzle #5, and nozzle #6 from a −X direction side in this order. That is, nozzle #1 is the nozzle N positioned in the most −X direction among the plurality of nozzles N forming a nozzle group, and nozzle #6 is the nozzle N positioned in the most +X direction among the plurality of nozzles N forming the nozzle group. Then, when the posture of the head unit 200 is in the Z-axis direction, in which the direction in which the plurality of nozzles N configuring the nozzle row 12 are arranged or a direction in which the plurality of liquid ejecting heads 10 are arranged is the vertical direction, the pressure of an ink in the head unit 200, which acts on each of the nozzles N, is maximum.

At this time, in the nozzle row 12_a_, the nozzle N, on which the maximum pressure of the ink acts, is nozzle #1, and the pressure of the ink, which has a dimension Dha as a water head, acts thereon. When the posture of the head unit 200 is in the Z-axis direction in which the direction in which the plurality of nozzles N configuring the nozzle row 12 are arranged or the direction in which the plurality of liquid ejecting heads 10 are arranged is the vertical direction, the dimension Dha is a distance between nozzle #1 of the nozzle row 12_a_ and nozzle #6 of the nozzle row 12_e_ which is the farthest from nozzle #1 of the nozzle row 12_a_ in the Z-axis direction, which is the vertical direction. In addition, in the nozzle row 12_b_, the nozzle N, on which the maximum pressure of the ink acts, is nozzle #1, and the pressure of the ink, which has a dimension Dhb as a water head, acts thereon. When the posture of the head unit 200 is in the Z-axis direction in which the direction in which the plurality of nozzles N configuring the nozzle row 12 are arranged or the direction in which the plurality of liquid ejecting heads 10 are arranged is the vertical direction, the dimension Dhb is a distance between nozzle #1 of the nozzle row 12_b_ and nozzle #6 of the nozzle row 12_e_ which is the farthest from nozzle #1 of the nozzle row 12_b_ in the Z-axis direction, which is the vertical direction. In addition, in the nozzle row 12_c_, the nozzles N, on which the maximum pressure of the ink acts, are nozzle #1 and nozzle #6, and the pressure of the ink, which has a dimension Dhc as a water head, acts thereon. When the posture of the head unit 200 is in the Z-axis direction in which the direction in which the plurality of nozzles N configuring the nozzle row 12 are arranged or the direction in which the plurality of liquid ejecting heads 10 are arranged is the vertical direction, the dimension Dhc is a distance between nozzle #1 of the nozzle row 12_c_ and nozzle #6 of the nozzle row 12_e_ which is the farthest from nozzle #1 of the nozzle row 12_c_ in the Z-axis direction, which is the vertical direction. In addition, when the posture of the head unit 200 is in the Z-axis direction in which the direction in which the plurality of nozzles N configuring the nozzle row 12 are arranged or the direction in which the plurality of liquid ejecting heads 10 are arranged is the vertical direction, the dimension Dhc is a distance between nozzle #6 of the nozzle row 12*c* and nozzle #1 of the nozzle row 12*a* which is the farthest from nozzle #6 of the nozzle row 12*c* in the Z-axis direction, which is the vertical direction. In addition, in the nozzle row 12*d*, the nozzle N, on which the maximum pressure of the ink acts, is nozzle #6, and the pressure of the ink, which has a dimension Dhb as a water head, acts thereon. When the posture of the head unit 200 is in the Z-axis direction in which the direction in which the plurality of nozzles N configuring the nozzle row 12 are arranged or the direction in which the plurality of liquid ejecting heads 10 are arranged is the vertical direction, the dimension Dhb is a distance between nozzle #6 of the nozzle row 12*d* and nozzle #1 of the nozzle row 12*a* which is the farthest from nozzle #6 of the nozzle row 12*d* in the Z-axis direction, which is the vertical direction. In addition, in the nozzle row 12*e*, the nozzle N, on which the maximum pressure of the ink acts, is nozzle #6, and the pressure of the ink, which has the dimension Dha as a water head, acts thereon. When the posture of the head unit 200 is in the Z-axis direction in which the direction in which the plurality of nozzles N configuring the nozzle row 12 are arranged or the direction in which the plurality of liquid ejecting heads 10 are arranged is the vertical direction, the dimension Dha is a distance between nozzle #6 of the nozzle row 12*e* and nozzle #1 of the nozzle row 12*a* which is the farthest from nozzle #6 of the nozzle row 12*e* in the Z-axis direction, which is the vertical direction.

Accordingly, in the present embodiment, the maximum pressure of an ink in the head unit 200, which is caused by the posture of the head unit 200 and acts on gas-liquid interfaces formed in the nozzles N, is the pressure of the ink, which has the dimension Dha as a water head. Therefore, in the present embodiment, the withstand pressure Pn, which is a pressure difference between the pressure on the ink side, at which the gas-liquid interfaces formed in the nozzles N can be maintained, and the pressure on the atmosphere side, is smaller than the pressure Ph1 of the ink, which has the dimension Dha as a water head. In addition, the withstand pressure Pn in the present embodiment is smaller than the pressure of an ink, which has the dimension Dhb as a water head, and is greater than the pressures of inks, which have the dimensions Dhc, Dhd, and Dhg shown in FIGS. 2 and 3A as water heads. In the present embodiment, when Dhg is set to 0.09 m, Dhd is set to 0.19 m, Dhc is set to 0.29 m, Dhb is set to 0.4 m, Dha is set to 0.5 m, and the specific weight of the ink is set to 10 $kN/m^3$, the pressure of the ink, which has the dimension Dhg as a water head, is 0.9 kPa, the pressure of the ink, which has the dimension Dhd as a water head, is 1.9 kPa, the pressure of the ink, which has the dimension Dhc as a water head, is 2.9 kPa, the pressure of the ink, which has the dimension Dhb as a water head, is 4 kPa, and the pressure of the ink, which has the dimension Dha as a water head, is 5 kPa. That is, in the present embodiment, the pressure Ph1 is 5 kPa.

When the mesh filter is adopted as the filter 16, the mesh filter can be a twill weave filter. As the mesh filter formed by weaving stainless steel wires, mesh that is a gap between the wires is provided. In this case, the mesh, which is the gap between the wires, is called the holes 16H.

When the perforated plate filter is adopted as the filter 16, the minimum dimension of the hole 16H is preferably smaller than the minimum dimension of the nozzle opening. The multiple holes 16H penetrating the stainless steel plate are formed in the perforated plate filter. The minimum dimension of the hole 16H is the diameter (inner diameter) of the hole 16H when the hole 16H is a circle. The shape of the hole 16H is not limited to a circle, and may be a polygon, such as a square and a hexagon, and an ellipse.

Figure 3B:
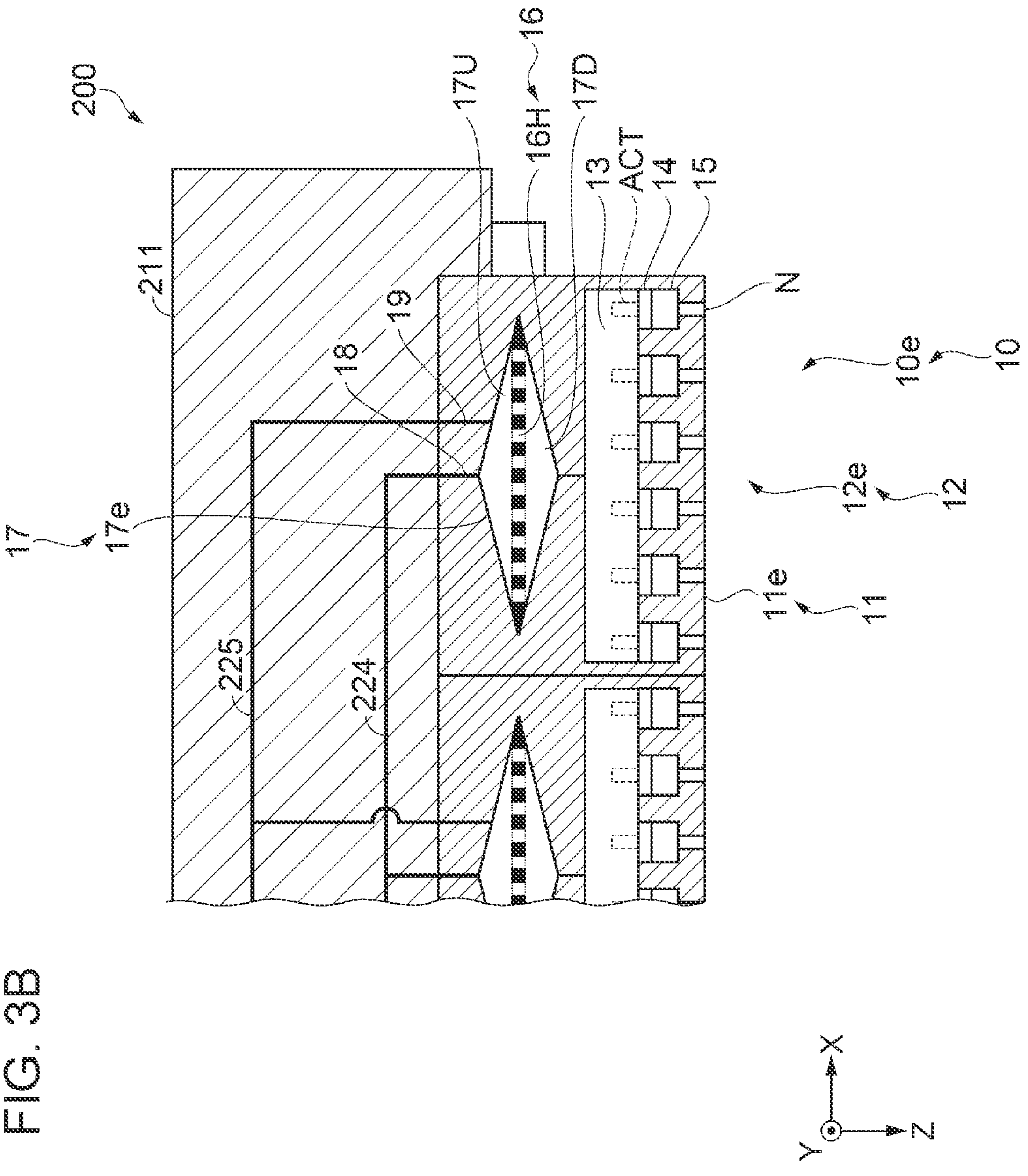
FIG. 3B is a cross sectional view of main portions, which shows a detailed configuration of the head unit.

As shown in FIG. 3B, the liquid ejecting head 10 has a common liquid chamber 13. The common liquid chamber 13 communicates with the filter chamber 17. Each of the liquid ejecting heads 10*a*, 10*b*, 10*c*, 10*d*, and 10*e* has the common liquid chamber 13. In the present embodiment, the common liquid chamber 13 included in the liquid ejecting head 10*a* communicates with the filter chamber 17*a*, the common liquid chamber 13 included in the liquid ejecting head 10*b* communicates with the filter chamber 17*b*, the common liquid chamber 13 included in the liquid ejecting head 10*c* communicates with the filter chamber 17*c*, the common liquid chamber 13 included in the liquid ejecting head 10*d* communicates with the filter chamber 17*d*, and the common liquid chamber 13 included in the liquid ejecting head 10*e* communicates with the filter chamber 17*e*.

The liquid ejecting head 10 has, in a manner corresponding to the plurality of nozzles N, a plurality of individual liquid chambers 15 each of which communicates with one nozzle N and a plurality of individual communication paths 14 each of which communicates with one individual liquid chamber 15. A discharge element ACT that can eject, as liquid droplets, an ink in the individual liquid chamber 15 from the nozzle N as being driven is provided in the individual liquid chamber 15. The discharge element ACT of the present embodiment is configured by a piezoelectric element that contracts when a drive voltage is applied. By applying and releasing the application of the drive voltage to the piezoelectric element, the ink in the individual liquid chamber 15, of which a volume is changed, is ejected from the nozzle N as liquid droplets.

As shown in FIG. 3A, in the present embodiment, the individual liquid chamber 15 communicating with the nozzle N included in the liquid ejecting head 10*a* communicates with the common liquid chamber 13 included in the liquid ejecting head 10*a* via the individual communication path 14. The individual liquid chamber 15 communicating with the nozzle N included in the liquid ejecting head 10*b* communicates with the common liquid chamber 13 included in the liquid ejecting head 10*b* via the individual communication path 14. The individual liquid chamber 15 communicating with the nozzle N included in the liquid ejecting head 10*c* communicates with the common liquid chamber 13 included in the liquid ejecting head 10*c* via the individual communication path 14. The individual liquid chamber 15 communicating with the nozzle N included in the liquid ejecting head 10*d* communicates with the common liquid chamber 13 included in the liquid ejecting head 10*d* via the individual communication path 14. The individual liquid chamber 15 communicating with the nozzle N included in the liquid ejecting head 10*e* communicates with the common liquid chamber 13 included in the liquid ejecting head 10*e* via the individual communication path 14.

For this reason, in the present embodiment, the nozzles N configuring one nozzle row, among the nozzle rows 12*a*, 12*b*, 12*c*, 12*d*, and 12*e*, and the nozzles N configuring another nozzle row communicate with each other via at least one filter 16. For example, nozzle #1 to nozzle #6 configuring the nozzle row 12*a* and nozzle #1 to nozzle #6 configuring the nozzle row 12*e* communicate with each other via the filter 16 of the filter chamber 17*a* and the filter 16 of the filter chamber 17*e*. In addition, for example, nozzle #1 to nozzle #6 configuring the nozzle row 12*c* and nozzle #1 to nozzle #6 configuring the nozzle row 12*a* communicate with each other via the filter 16 of the filter chamber 17*c* and the filter 16 of the filter chamber 17*a*. In addition, for example, nozzle #1 to nozzle #6 configuring the nozzle row 12*c* and nozzle #1 to nozzle #6 configuring the nozzle row 12*e* communicate with each other via the filter 16 of the filter chamber 17*c* and the filter 16 of the filter chamber 17*e*.

As shown in FIGS. 1 to 3A, the fluid flowing unit 20 has a coupling flow path 22, a liquid storage unit 23, the liquid flow path 24, the fluid flow path 25, and an atmospheric passage 26. An ink in a liquid accommodating portion 21 can be supplied to the liquid storage unit 23 through the coupling flow path 22 by attaching the liquid accommodating portion 21. The liquid storage unit 23 stores the ink supplied from the liquid accommodating portion 21. An atmosphere opening hole 23AH is provided in an upper surface of the liquid storage unit 23. An internal space where the liquid storage unit 23 stores the ink communicates with the atmosphere, which is an external space, through the atmosphere opening hole 23AH. A liquid level of the ink stored in the liquid storage unit 23 is adjusted to a position in the +Z direction with respect to the nozzle surface 11 of the head unit 200.

By coupling the liquid flow path 24 to the common flow path 224 of the head unit 200, the upstream chamber 17U of the filter chamber 17 and the liquid storage unit 23 can communicate with each other. The liquid flow path 24 is an example of a first passage through which the upstream chamber 17U and the liquid storage unit 23 can communicate with each other. The liquid flow path 24 and the liquid storage unit 23 are coupled to each other on a side surface of the liquid storage unit 23. A position where the liquid flow path 24 is coupled to the liquid storage unit 23 is positioned in the +Z direction with respect to the atmosphere opening hole 23AH of the liquid storage unit 23. The liquid flow path 24 is provided with a first pump 24P, a first opening/closing valve 24V, and the liquid flow path side coupling portion 24C described above. The first pump 24P can flow an ink between the liquid storage unit 23 and the head unit 200, and for example, an ink in the liquid flow path 24 flows in a supply direction indicated as a direction of an arrow of FIG. 3A by driving the first pump 24P. The first opening/closing valve 24V can switch between an open state where flow of the ink in the liquid flow path 24 is allowed and a closed state where the flow of the ink is blocked.

By coupling the fluid flow path 25 to the second common flow path 225 of the head unit 200, the liquid storage unit 23 and the upstream chamber 17U of the filter chamber 17 can communicate with each other. The fluid flow path 25 is an example of a second passage through which the liquid storage unit 23 and the upstream chamber 17U can communicate with each other. The fluid flow path 25 and the liquid storage unit 23 are coupled to each other on the side surface of the liquid storage unit 23. A position where the fluid flow path 25 is coupled to the liquid storage unit 23 is positioned in the +Z direction with respect to the atmosphere opening hole 23AH of the liquid storage unit 23, and is positioned in the −Z direction with respect to the position where the liquid flow path 24 is coupled to the liquid storage unit 23. The fluid flow path 25 is provided with a second pump 25P, a switching valve 27, and the fluid flow path side coupling portion 25C described above. The second pump 25P can flow a fluid between the liquid storage unit 23 and the head unit 200, and for example, an ink in the fluid flow path 25 flows in a return direction indicated as a direction of an arrow of FIG. 3A by driving the second pump 25P. The second pump 25P is an example of an introduction pump.

In the fluid flow path 25, the switching valve 27 is provided at a position closer to the liquid storage unit 23 than the second pump 25P is. That is, in the fluid flow path 25, the switching valve 27 is disposed between the second pump 25P and the liquid storage unit 23. The atmospheric passage 26 is coupled to the fluid flow path 25 via the switching valve 27. The atmospheric passage 26 is an example of a gas introduction unit through which a gas can be introduced into the filter chamber 17 of the liquid ejecting head 10 by making the fluid flow path 25 communicate with the atmosphere. By driving the switching valve 27, the state of the fluid flow path 25 can be switched between an open state where the fluid flow path 25 and the liquid storage unit 23 communicate with each other, a closed state where flow of a fluid in the fluid flow path 25 is blocked, and a communication state where the fluid flow path 25 and the atmospheric passage 26 communicate with each other. Since the fluid flow path 25 and the atmospheric passage 26 do not communicate with each other in the open state and the closed state, the open state and the closed state are non-communication states where the fluid flow path 25 and the atmospheric passage 26 do not communicate with each other. In other words, the switching valve 27 can switch between the communication state where the fluid flow path 25 and the atmospheric passage 26 communicate with each other and the non-communication states where the fluid flow path 25 and the atmospheric passage 26 do not communicate with each other.

The transport mechanism 30 transports the printing paper P in a transport direction. As shown in FIG. 1, the transport direction in the present embodiment is a +Y direction and a −Y direction. The transport mechanism 30 includes a transport rod 34, on which three transport rollers 32 are mounted, and a transport motor 36 rotationally driving the transport rod 34. As the transport motor 36 rotationally drives the transport rod 34, the plurality of transport rollers 32 rotate and the printing paper P is transported in the +Y direction that is the transport direction. The number of transport rollers 32 is not limited to three, and may be any number. In addition, a configuration where a plurality of transport mechanisms 30 are included may be adopted.

As shown in FIGS. 1 to 3A, the head unit 200 is detachably mounted on the mounting portion 40. An attaching/detaching direction in the present embodiment is the X-axis direction, a direction in which the head unit 200 is mounted on the mounting portion 40 is the −X direction, and a direction in which the head unit 200 is removed from the mounting portion 40 is the +X direction. As the head unit 200 is mounted on the mounting portion 40, the common flow path 224 of the head unit 200 communicates with the liquid flow path 24, and the second common flow path 225 communicates with the fluid flow path 25. In addition, as the head unit 200 is mounted on the mounting portion 40, the head unit 200 and a main body side are electrically coupled to each other, and it becomes possible to eject an ink from the nozzles N under drive-control of the discharge element ACT by the control unit 90 to be described later.

The maintenance unit 50 maintains the head unit 200. The maintenance unit 50 has a maintenance unit holding portion 51, a maintenance unit drive unit 52, a cap 61, a cap valve 62, a suction pump 63, a waste liquid tube 64, a waste liquid collecting unit 66, and a wiper 71.

The cap 61 maintains the head unit 200 by discharging an ink from the nozzles N of the head unit 200. By coming into contact with the nozzle surface 11 of the head unit 200, the cap 61 forms a suction space where the plurality of nozzles N are open. The cap 61 is held by the maintenance unit holding portion 51. By driving the maintenance unit drive unit 52, the maintenance unit holding portion 51 holding the cap 61 moves in any one of the Y-axis direction and the Z-axis direction. By driving the maintenance unit drive unit 52, the cap 61 moves to a non-capping position where the cap is not in contact with the nozzle surface 11 and a suctionable position where the cap is in contact with the nozzle surface 11.

The cap 61, via the waste liquid tube 64, communicates with the waste liquid collecting unit 66 collecting a waste liquid. The waste liquid tube 64 is provided with the suction pump 63 for sucking the suction space where the cap 61 is formed. In addition, at a position between the cap 61 and the suction pump 63 in the waste liquid tube 64, the cap valve 62 that can switch a coupling state between the cap 61 and the suction pump 63 between an open state where the cap 61 and the suction pump 63 communicate with each other and a closed state where the cap 61 and the suction pump 63 do not communicate with each other is provided.

The cap 61 includes a cap 61*a* that can form a suction space where the plurality of nozzles N of the nozzle row 12*a* are open by coming into contact with the nozzle surface 11*a* included in the head unit 200, a cap 61*b* that can form a suction space where the plurality of nozzles N of the nozzle row 12*b* are open by coming into contact with the nozzle surface lib, a cap 61*c* that can form a suction space where the plurality of nozzles N of the nozzle row 12*c* are open by coming into contact with the nozzle surface 11*c*, a cap 61*d* that can form a suction space where the plurality of nozzles N of the nozzle row 12*d* are open by coming into contact with the nozzle surface 11*d*, and a cap 61*e* that can form a suction space where the plurality of nozzles N of the nozzle row 12*e* are open by coming into contact with the nozzle surface 11*e*.

The cap valve 62 includes a cap valve 62*a* that can switch a coupling state between the cap 61*a* and the suction pump 63, a cap valve 62*b* that can switch a coupling state between the cap 61*b* and the suction pump 63, a cap valve 62*c* that can switch a coupling state between the cap 61*c* and the suction pump 63, a cap valve 62*d* that can switch a coupling state between the cap 61*d* and the suction pump 63, and a cap valve 62*e* that can switch a coupling state between the cap 61*e* and the suction pump 63.

The cap 61 of the present embodiment maintains the head unit 200 by discharging an ink from the plurality of nozzles N configuring any one of the plurality of nozzle rows 12*a*, 12*b*, 12*c*, 12*d*, and 12*e*. For example, when maintaining the nozzle row 12*a*, the plurality of suction spaces where the plurality of nozzles N configuring each of the nozzle rows 12*a*, 12*b*, 12*c*, 12*d*, and 12*e* are open are formed by moving the caps 61*a*, 61*b*, 61*c*, 61*d*, and 61*e* to the suctionable position.

Then, by bringing the cap valve 62*a* into the open state, bringing the other cap valves 62*b*, 62*c*, 62*d*, and 62*e* into the closed state, and driving the suction pump 63, an ink is discharged from the plurality of nozzles N configuring the nozzle row 12*a* to the suction space. The ink discharged to the suction space is collected in the waste liquid collecting unit 66 via the waste liquid tube 64. In addition, when maintaining the nozzle rows 12*a*, 12*b*, 12*c*, 12*d*, and 12*e*, by bringing the cap valves 62*a*, 62*b*, 62*c*, 62*d*, and 62*e* into the open state and driving the suction pump 63, an ink is discharged from the plurality of nozzles N configuring the nozzle rows 12*a*, 12*b*, 12*c*, 12*d*, and 12*e* to the suction spaces.

The wiper 71 maintains the head unit 200 by wiping the nozzle surface 11 of the head unit 200. The wiper 71 is held by the maintenance unit holding portion 51. By driving the maintenance unit drive unit 52, the wiper 71 moves, in the Z-axis direction, between a standby position where the wiper is not in contact with the nozzle surface 11 and a wiping position where the wiper is in contact with the nozzle surface 11. In the present embodiment, by driving the maintenance unit drive unit 52 in a state where the wiper 71 is at the wiping position, the maintenance unit holding portion 51 holding the wiper 71 is moved in the Y-axis direction, wiping the nozzle surfaces 11*a*, 11*b*, 11*c*, 11*d*, and 11*e* configuring the nozzle surface 11.

The input/output unit 80 has a display unit 81 and an operation unit 82. The display unit 81 is an example of a notification unit issuing notification on guidance display of an operation of the liquid ejecting apparatus 500 and information related to the liquid ejecting apparatus 500. A user can perform various types of operations on the liquid ejecting apparatus 500 by operating the operation unit 82 while referring to content displayed on the display unit 81. The operation unit 82 may not be provided when the display unit 81 is configured by a liquid crystal display module having a touch panel function and has a function as an operation unit performing various types of settings on the liquid ejecting apparatus 500.

The control unit 90 controls the entire liquid ejecting apparatus 500. For example, the control unit 90 controls an operation of flowing a fluid between the liquid storage unit 23 and the head unit 200 by the fluid flowing unit 20, an operation of transporting the printing paper P along the transport direction, an operation of ejecting an ink from the nozzles N of the head unit 200, an operation of maintenance of the head unit 200 by the maintenance unit 50, and control of the liquid ejecting apparatus 500 and issuance of notification to the user based on a user instruction through the input/output unit 80. The control unit 90 may be configured, for example, by a processing circuit, such as a central processing unit (CPU) and a field programmable gate array (FPGA), and a memory circuit such as a semiconductor memory.

The head unit 200 of the present embodiment is detachably provided on the mounting portion 40. For example, when the posture of the head unit 200 is tilted with respect to the posture shown in FIGS. 1 to 3A by removing the head unit 200 from the mounting portion 40, a height difference between the plurality of nozzles N configuring the nozzle row 12 occurs. In this case, the pressure of an ink in the head unit 200 caused by the height difference between the plurality of nozzles N acts on gas-liquid interfaces formed in the nozzles N by the ink. When the pressure of the ink in the head unit 200, which acts on the gas-liquid interfaces formed in the nozzles N by the ink, is greater than the withstand pressure Pn that is a pressure difference between a pressure on the ink side, at which the gas-liquid interfaces formed in the nozzles N can be maintained, and a pressure on the atmosphere side, there is a possibility that the gas-liquid interfaces formed in the nozzles N are broken and an ink leakage from the nozzles N occurs.

In the head unit 200 of the present embodiment, the nozzles N configuring one nozzle row, among the nozzle rows 12*a*, 12*b*, 12*c*, 12*d*, and 12*e*, and the nozzles N configuring another nozzle row communicate with each other via at least one filter 16. In addition, when a pressure difference between a pressure on the ink side, at which gas-liquid interfaces formed in the holes 16H of the filter 16 can be maintained, and a pressure on the atmosphere side is defined as the withstand pressure Pf, the withstand pressure Pf is greater than the withstand pressure Pn. That is, the specifications of the holes 16H of the filter 16 in the present embodiment are set such that the withstand pressure Pf is greater than the withstand pressure Pn.

Accordingly, when the pressure of an ink in the head unit 200, which is caused by a height difference between the plurality of nozzles N, acts on gas-liquid interfaces formed in the nozzles N, an ink leakage from the nozzles N can be prevented by forming the gas-liquid interfaces in the holes 16H of the filter 16 in the head unit 200 of the present embodiment. In addition, since the gas-liquid interfaces can be formed in the holes 16H of the filter 16 by replacing an ink in the filter chamber 17 with the atmosphere, pre-operation time reduction, wasteful ink reduction, and reduction of usage of the waste liquid collecting unit 66 are achieved, for example, compared to a case where the ink in the head unit 200 is completely discharged in a pre-operation executed before the head unit 200 is removed.

Thus, the control unit 90 drive-controls, before the head unit 200 is removed from the mounting portion 40, the switching valve 27 such that the atmosphere can be introduced into the filter chamber 17, and executes the pre-operation of forming gas-liquid interfaces in the holes 16H of the filter 16 by introducing the atmosphere into the filter chamber 17. Herein, with reference to a flowchart shown in FIG. 4, flow of processing executed when the control unit 90 performs control including the pre-operation in the present embodiment will be described. In the present embodiment, the flow of the processing executed when the control unit 90 performs control including the pre-operation corresponds to a control method of the liquid ejecting apparatus 500.

When the user performs, on the input/output unit 80, an operation for removing the head unit 200, the control unit 90 determines, in Step S11, whether or not the head unit 200 is filled with an ink. When the head unit 200 is not filled with the ink in Step S11, it is NO in Step S11. When it is NO in Step S11, the control unit 90 takes the processing to Step S15, and displays, on the display unit 81, a message that the head unit 200 can be removed. When the processing of Step S15 is executed, the control unit 90 terminates the processing executed when control including the pre-operation is performed.

When the head unit 200 is filled with the ink in Step S11, it is YES in Step S11. The control unit 90 takes the processing to Step S12. In Step S12, the control unit 90 displays, on the display unit 81, a message that removal of the head unit 200 is under preparation.

In Step S13, the control unit 90 executes the pre-operation. In the pre-operation, the control unit 90 drive-controls the switching valve 27, bringing the switching valve 27 into the communication state. Accordingly, the fluid flow path 25 communicates with the atmospheric passage 26, and it becomes a state where the atmosphere from the atmospheric passage 26 can be introduced into the filter chambers 17*a*, 17*b*, 17*c*, 17*d*, and 17*e* via the fluid flow path 25, the second common flow path 225, and the second filter flow path 19. In the communication state, the control unit 90 brings the first opening/closing valve 24V into the open state, and drive-controls the second pump 25P and the first pump 24P such that flows of a fluid in the atmospheric passage 26, the fluid flow path 25, and the liquid flow path 24 are in directions of arrows of FIG. 5A. Accordingly, as shown in FIG. 5A, the atmosphere flows into the fluid flow path 25, the second common flow path 225, and each second filter flow path 19 via the atmospheric passage 26.

An ink in the fluid flow path 25, the second common flow path 225, and each second filter flow path 19 flows in each first filter flow path 18, the common flow path 224, and the liquid flow path 24 toward the liquid storage unit 23 via the filter chambers 17*a*, 17*b*, 17*c*, 17*d*, and 17*e*. In consideration of a possibility that the ink drops from the nozzles N during the execution of the pre-operation, the control unit 90 may drive-control the maintenance unit drive unit 52, and move the cap 61 to the suctionable position as shown in FIG. 5A before drive-controlling the switching valve 27.

Figure 5A:
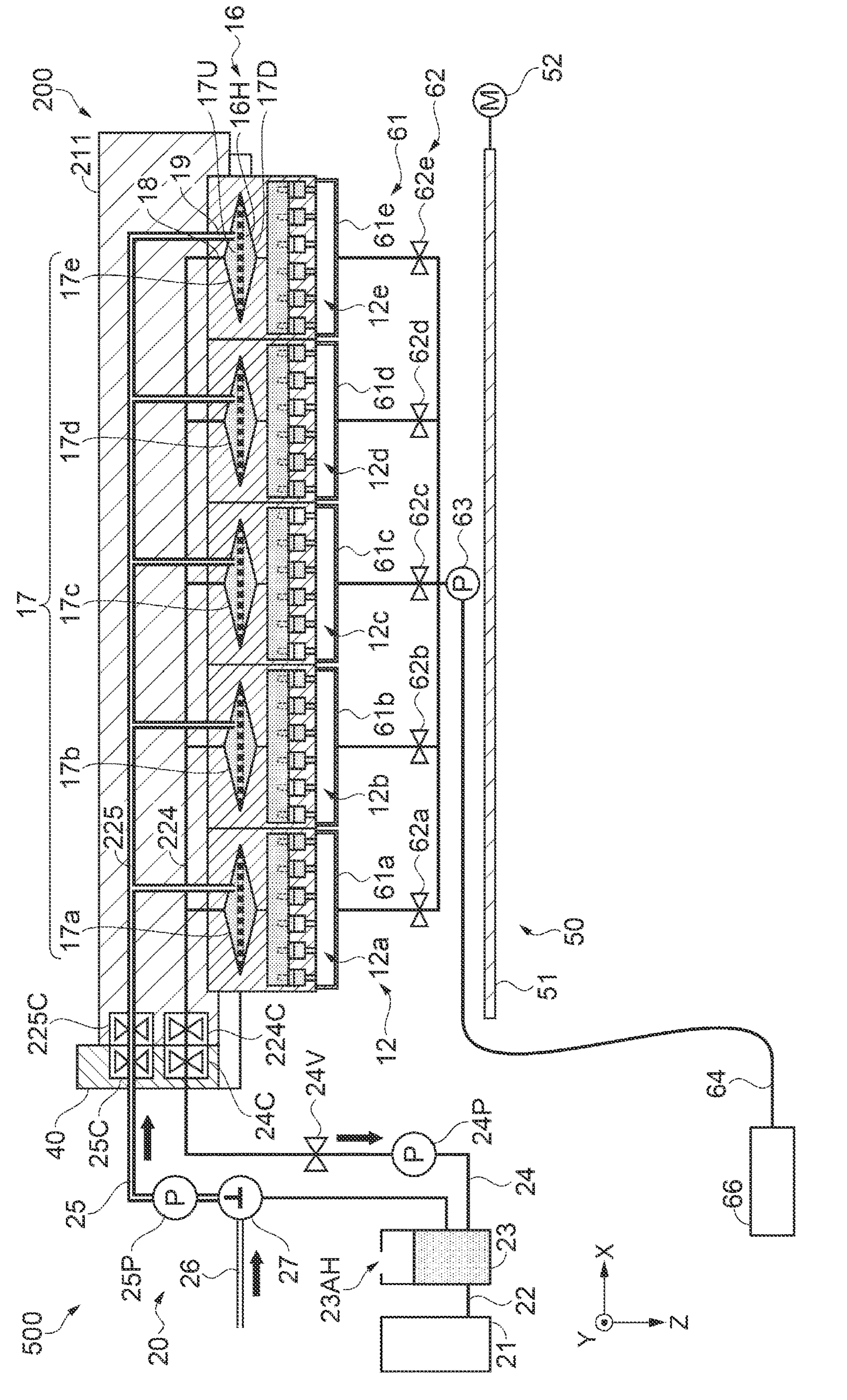
FIG. 5A is a cross sectional view showing a state where a gas has flowed into the head unit in the pre-operation.
Figure 5B:
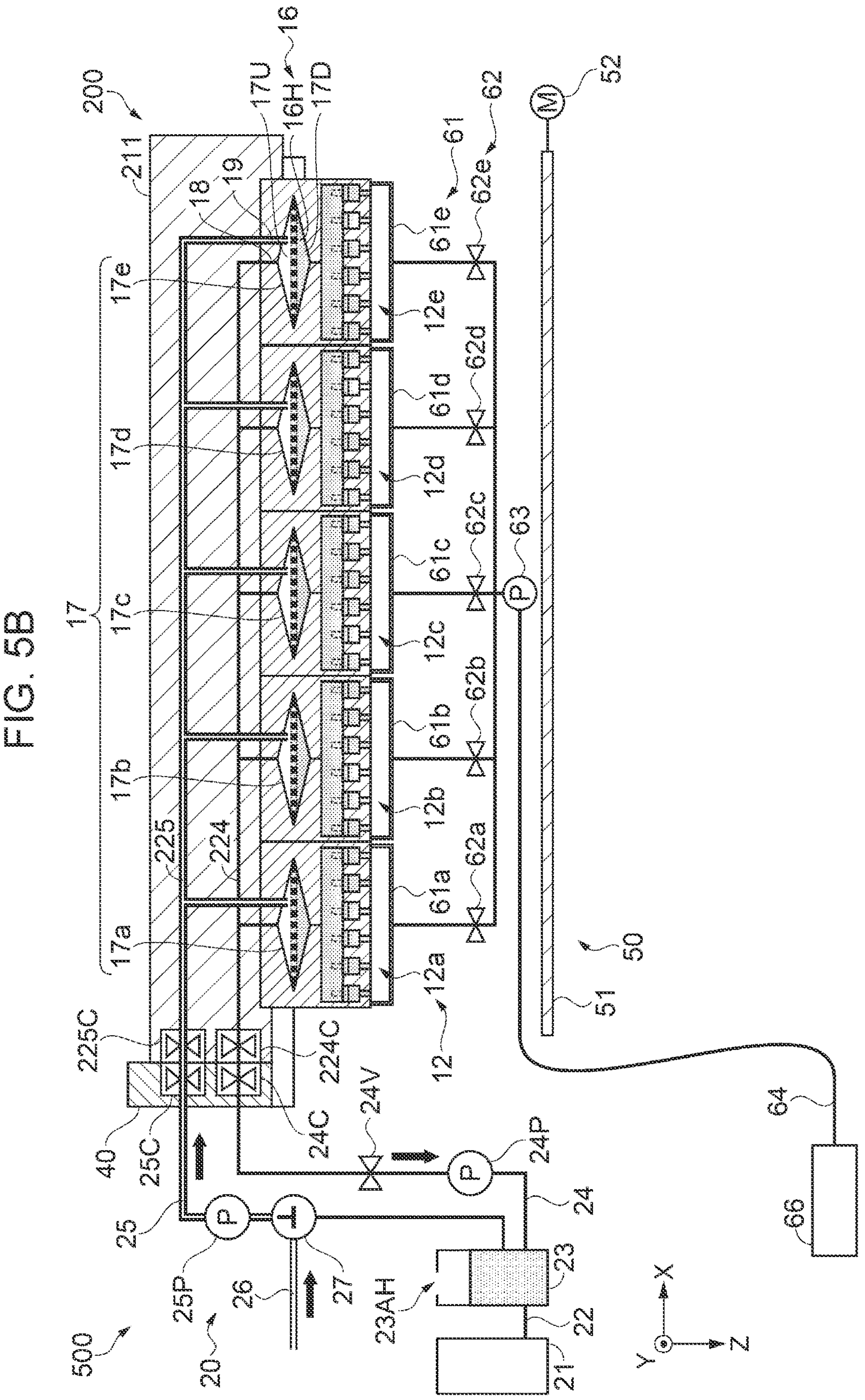
FIG. 5B is a cross sectional view showing a state where the gas has flowed into an upstream chamber of a filter chamber in the pre-operation.

When the second pump 25P and the first pump 24P are continued to be further driven from the state shown in FIG. 5A, the atmosphere flows into the upstream chambers 17U of the filter chambers 17*a*, 17*b*, 17*c*, 17*d*, and 17*e*, and an ink in each upstream chamber 17U is replaced with the atmosphere as shown in FIG. 5B. Accordingly, a gas-liquid interface is formed on each upstream chamber 17U side of each of holes 16H of the filters 16 in the filter chambers 17*a*, 17*b*, 17*c*, 17*d*, and 17*e*. As the atmosphere flows into each upstream chamber 17U, an ink in each upstream chamber 17U, each first filter flow path 18, and the common flow path 224 flows toward the liquid storage unit 23.

When an ink in the upstream chamber 17U is replaced with the atmosphere, the control unit 90 may control the driving of the second pump 25P such that the inside of the upstream chamber 17U has a higher pressure than the atmospheric pressure. For example, the control unit 90 may control the driving of the second pump 25P such that the flow rate of a fluid depending on the second pump 25P is higher than the flow rate of a fluid depending on the driving of the first pump 24P. In addition, at this time, the control unit 90 may control the driving of the second pump 25P such that a pressure in the upstream chamber 17U is higher than a pressure in the downstream chamber 17D and a difference between the pressure in the upstream chamber 17U and the pressure in the downstream chamber 17D is greater than the withstand pressure Pf.

Figure 5C:
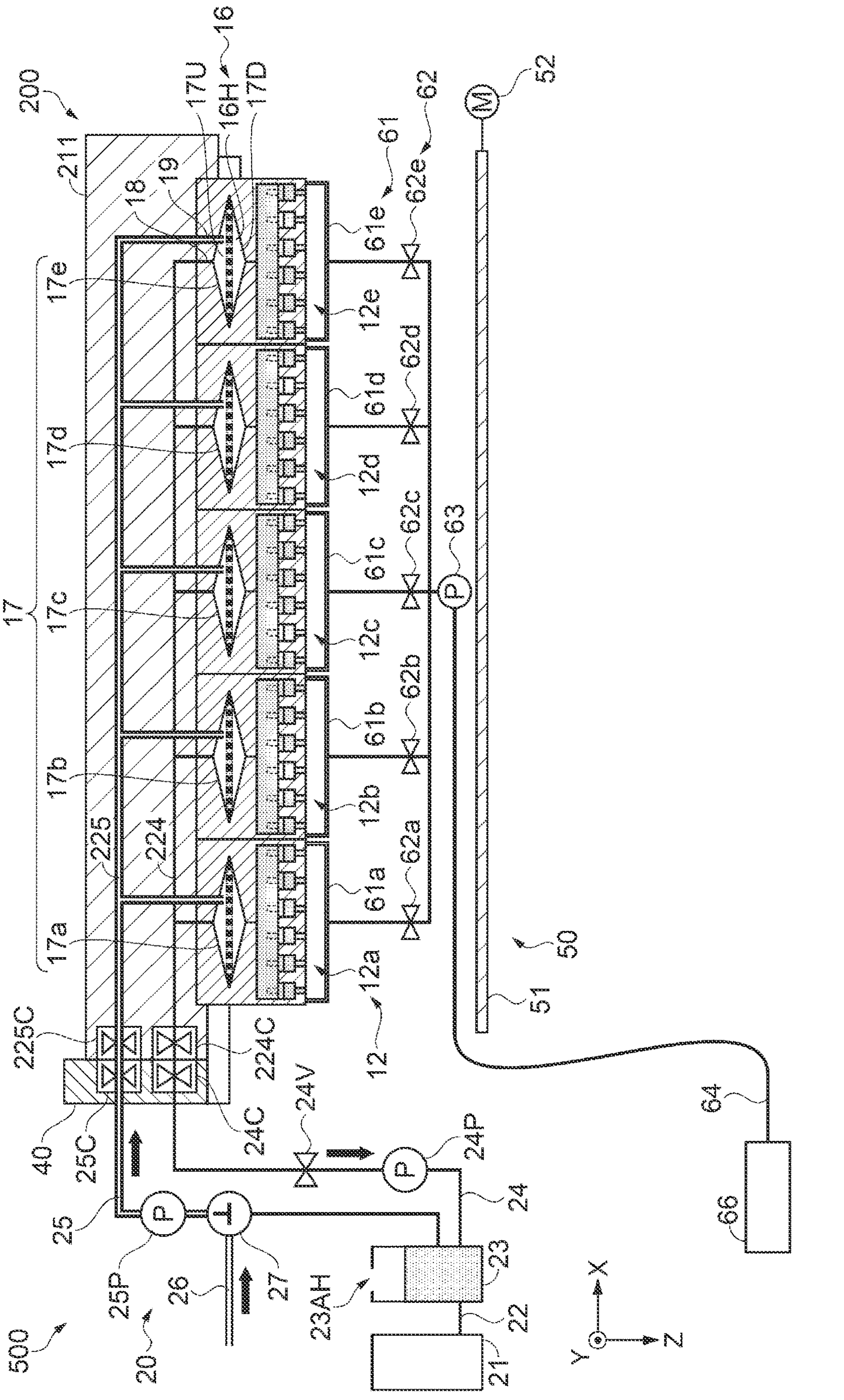
FIG. 5C is a cross sectional view showing a state where the gas has flowed into a downstream chamber of the filter chamber in the pre-operation.

The control unit 90 may terminate the pre-operation once gas-liquid interfaces are formed on the upstream chamber 17U side of the holes 16H in the filter 16, but in the present embodiment, the atmosphere is flowed also into the downstream chamber 17D of the filter chamber 17 in the pre-operation. When the control unit 90 continues to further drive the second pump 25P and the first pump 24P, the atmosphere flows into the downstream chambers 17D of the filter chambers 17*a*, 17*b*, 17*c*, 17*d*, and 17*e*, and an ink in each downstream chamber 17D is replaced with the atmosphere as shown in FIG. 5C. At this time, an ink in the holes 16H of each filter 16 stays in the holes 16H without being replaced with the atmosphere, and gas-liquid interfaces are formed on both sides including the upstream chamber 17U side and a downstream chamber 17D side by the ink staying in the holes 16H.

When it is difficult for the atmosphere to flow into the downstream chamber 17D, for example, the control unit 90 may control the driving of the second pump 25P such that a pressure in the upstream chamber 17U is higher than a pressure in the downstream chamber 17D and a difference between the pressure in the upstream chamber 17U and the pressure in the downstream chamber 17D is greater than the withstand pressure Pf. At this time, even when some of the ink in the head unit 200 drops from the nozzles N, the ink can be collected by the cap 61 by moving the cap 61 to the suctionable position as shown in FIG. 5C.

Figure 5D:
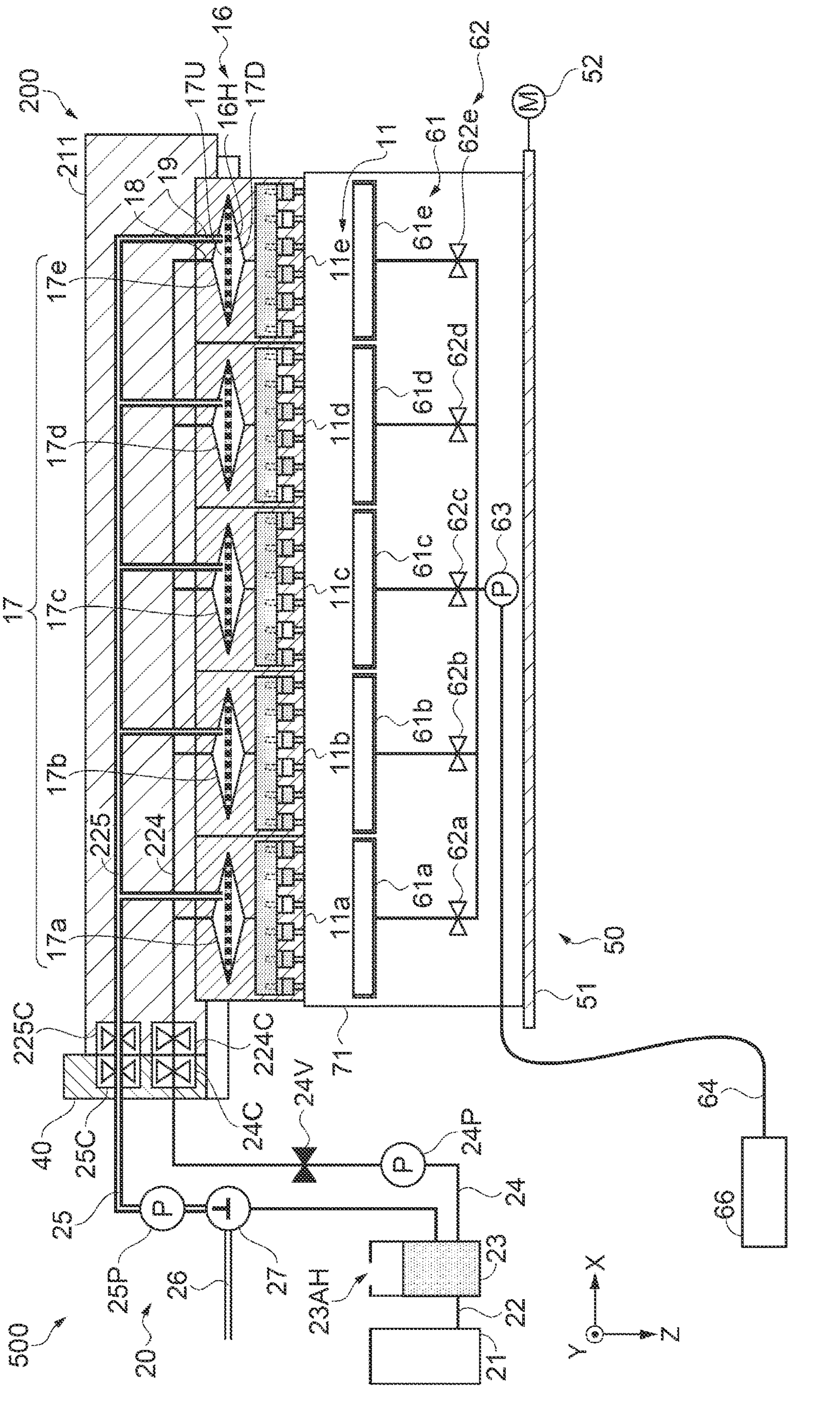
FIG. 5D is a cross sectional view showing an operation of maintenance.

When the pre-operation is terminated in Step S13, the control unit 90 takes the processing to Step S14. In Step S14, the control unit 90 executes the operation of maintenance. As the operation of maintenance, the control unit 90 wipes the nozzle surfaces 11*a*, 11*b*, 11*c*, 11*d*, and 11*e* configuring the nozzle surface 11 by drive-controlling the maintenance unit drive unit 52 and moving the maintenance unit holding portion 51 holding the wiper 71 in the Y-axis direction as shown in FIG. 5D. In addition, in the present embodiment, as shown in FIG. 5D, an ink is accommodated in the head unit 200 even after executing the pre-operation. In this case, after the wiping, the control unit 90 may perform flushing of straightening out the state of the ink in the nozzles N by driving the discharge elements ACT and discharging the ink from the nozzles N.

When the operation of maintenance is terminated in Step S14, the control unit 90 takes the processing to Step S15. In Step S15, the control unit 90 displays, on the display unit 81, a message that the head unit 200 can be removed. When the processing of Step S15 is executed, the control unit 90 terminates the processing executed when control including the pre-operation is performed.

As described hereinbefore, with the liquid ejecting apparatus 500 and the control method of the liquid ejecting apparatus 500 according to Embodiment 1, the following effects can be obtained.

The liquid ejecting apparatus 500 includes the head unit 200 having the plurality of nozzles N ejecting an ink, the head unit 200 including the filter 16 provided with the holes 16H through which the ink can pass, the filter chamber 17*a* including the upstream chamber 17U and the downstream chamber 17D, which are partitioned by the filter 16, the nozzle row 12*a* formed by the plurality of nozzles N, and the nozzle row 12*e* formed by the plurality of nozzles N, the mounting portion 40 on which the head unit 200 is detachably mounted, the switching valve 27 that can make the atmosphere introduced into the filter chamber 17*a*, and the control unit 90. The nozzles N forming the nozzle row 12*e* communicate with the nozzles N forming the nozzle row 12*a* via the filter 16 of the filter chamber 17*a*. When a pressure difference between a pressure on the atmosphere side and a pressure on the ink side, at which gas-liquid interfaces formed in the holes 16H of the filter 16 can be maintained, is defined as the withstand pressure Pf and a pressure difference between the pressure on the atmosphere side and the pressure on the ink side, at which gas-liquid interfaces formed in the nozzles N can be maintained, is defined as the withstand pressure Pn, the withstand pressure Pf is greater than the withstand pressure Pn. The control unit 90 executes, before the head unit 200 is removed from the mounting portion 40, the pre-operation of forming the gas-liquid interfaces in the holes 16H provided in the filter 16 by controlling the switching valve 27 and introducing the atmosphere into the filter chamber 17*a*.

The posture of the head unit 200 changes due to the removal of the head unit 200, and the pressure of an ink in the head unit 200, which is caused by a height difference between the plurality of nozzles N occurring due to the change in the posture of the head unit 200, acts on gas-liquid interfaces formed in the nozzles N. In this case, since the nozzles N forming the nozzle row 12*e* communicate, with the nozzles N forming the nozzle row 12*a* via the filter 16 of the filter chamber 17*a*, an ink leakage from the nozzles N can be prevented by the withstand pressure Pf of the gas-liquid interfaces formed in the holes 16H of the filter 16.

When a maximum pressure among pressures of an ink in the head unit 200, which are caused by a height difference between the plurality of nozzles N included in the head unit 200 and act on gas-liquid interfaces formed in the nozzles N, is defined as the pressure Ph1, the withstand pressure Pf is greater than the pressure Ph1. An ink leakage from the nozzles N, which is caused by a change in the posture of the head unit 200 due to the withstand pressure Pf of the gas-liquid interfaces formed in the holes 16H of the filter 16, can be prevented.

The liquid ejecting apparatus 500 includes the liquid storage unit 23 storing an ink, the liquid flow path 24 that can make the upstream chamber 17U and the liquid storage unit 23 communicate with each other, the fluid flow path 25 that can make the liquid storage unit 23 and the upstream chamber 17U communicate with each other, the atmospheric passage 26 communicating with the fluid flow path 25, the switching valve 27 that can switch, as the gas introduction unit, the atmospheric passage 26 between the communication state where the atmospheric passage communicates with the fluid flow path 25 and the non-communication state where the atmospheric passage does not communicate with the fluid flow path 25, and the second pump 25P provided in the fluid flow path 25. The control unit 90 controls the switching valve 27 such that the switching valve is brought into the communication state, drives the second pump 25P such that the atmosphere is introduced from the atmospheric passage 26 to the upstream chamber 17U via the fluid flow path 25, and executes the pre-operation of forming gas-liquid interfaces in the holes 16H of the filter 16 by returning an ink in the upstream chamber 17U to the liquid storage unit 23 via the liquid flow path 24. According to this, it is easy to form the gas-liquid interfaces in the holes 16H of the filter 16.

The control unit 90 may drive the second pump 25P such that a pressure in the upstream chamber 17U is higher than a pressure in the downstream chamber 17D and a pressure difference between the pressure in the upstream chamber 17U and the pressure in the downstream chamber 17D is greater than the withstand pressure Pf. According to this, it is easier to form gas-liquid interfaces in the holes 16H of the filter 16.

The head unit 200 has the filter 16, the filter chamber 17*e* including the upstream chamber 17U and the downstream chamber 17D, which are partitioned by the filter 16, and the common flow path 224 communicating with the upstream chamber 17U of the filter chamber 17*a* and the upstream chamber 17U of the filter chamber 17*e*. The plurality of nozzles N forming the nozzle row 12*a* and the plurality of nozzles N forming the nozzle row 12*e* eject an ink supplied via the common flow path 224. The nozzles N forming the nozzle row 12*e* communicate with the nozzles N forming the nozzle row 12*a* via the filter 16 of the filter chamber 17*e*, the common flow path 224, and the filter 16 of the filter chamber 17*a*. The switching valve 27 can make the atmosphere introduced into the filter chamber 17*a* and the filter chamber 17*e*. The control unit 90 forms gas-liquid interfaces in the holes 16H provided in the filter 16 of the filter chamber 17*a* and the holes 16H provided in the filter 16 of the filter chamber 17*e* by introducing the atmosphere into the filter chamber 17*a* and the filter chamber 17*e* in the pre-operation.

According to this, since the nozzles N forming the nozzle row 12*e* communicate with the nozzles N forming the nozzle row 12*a* via the filter 16 of the filter chamber 17*e* and the filter 16 of the filter chamber 17*a*, an ink leakage from the nozzles N can be further prevented by the withstand pressure Pf of gas-liquid interfaces formed in the holes 16H of the filter 16.

The control method of the liquid ejecting apparatus 500 including the head unit 200 having the plurality of nozzles N ejecting an ink, the head unit 200 including the filter 16 provided with the holes 16H through which the ink can pass, the nozzle row 12*a* formed by the plurality of nozzles N, and the nozzle row 12*e* formed by the plurality of nozzles N and the mounting portion 40 on which the head unit 200 is detachably mounted, in which the nozzles N forming the nozzle row 12*e* communicate with the nozzles N forming the nozzle row 12*a* via the filter 16, and when a pressure difference between a pressure on the atmosphere side and a pressure on the ink side, at which gas-liquid interfaces formed in the holes 16H of the filter 16 can be maintained, is defined as the withstand pressure Pf and a pressure difference between the pressure on the atmosphere side and the pressure of an ink, at which gas-liquid interfaces formed in the nozzles N can be maintained, is defined as the withstand pressure Pn, the withstand pressure Pf is greater than the withstand pressure Pn. The control method of the liquid ejecting apparatus 500 includes executing, before the head unit 200 is removed from the mounting portion 40, the pre-operation of forming the gas-liquid interfaces in the holes 16H provided in the filter 16.

According to this, when the pressure of an ink in the head unit 200, which is caused by a change in the posture of the head unit 200 due to the removal of the head unit 200, acts on the gas-liquid interfaces formed in the nozzles N, an ink leakage from the nozzles N can be prevented.

2. Embodiment 2

Next, the liquid ejecting apparatus 500 and the control method of the liquid ejecting apparatus 500 of Embodiment 2, which is an embodiment of the present disclosure, will be described. Portions common to the liquid ejecting apparatus 500 and the control method of the liquid ejecting apparatus 500 of Embodiment 1 will be assigned with the same reference signs, and description thereof will be omitted.

The specifications of the liquid ejecting apparatus 500 and the head unit 200 of the present embodiment are the same as the liquid ejecting apparatus 500 and the head unit 200 of Embodiment 1. Accordingly, caused by the posture of the head unit 200, the pressure of an ink, which acts on the nozzles N of the nozzle row 12*a* and has the dimension Dha as a water head, the pressure of an ink, which acts on the nozzles N of the nozzle row 12*b* and has the dimension Dhb as a water head, the pressure of an ink, which acts on the nozzles N of the nozzle row 12*d* and has the dimension Dhb as a water head, and the pressure of an ink, which acts on the nozzles N of the nozzle row 12*e* and has the dimension Dha as a water head, are greater than the withstand pressure Pn of gas-liquid interfaces formed in the nozzles N. In addition, the pressure of an ink, which is caused by the posture of the head unit 200, acts on the nozzles N of the nozzle row 12*c*, and has the dimension Dhc as a water head, is smaller than the withstand pressure Pn. For this reason, when the pressure of the ink, which has the dimension Dhc as a water head, acts on the nozzles N of the nozzle row 12*c*, gas-liquid interfaces of the nozzles N of the nozzle row 12*c* are not broken even if gas-liquid interfaces are not formed in the holes 16H of the filter 16 in the filter chamber 17*c*.

Figure 6A:
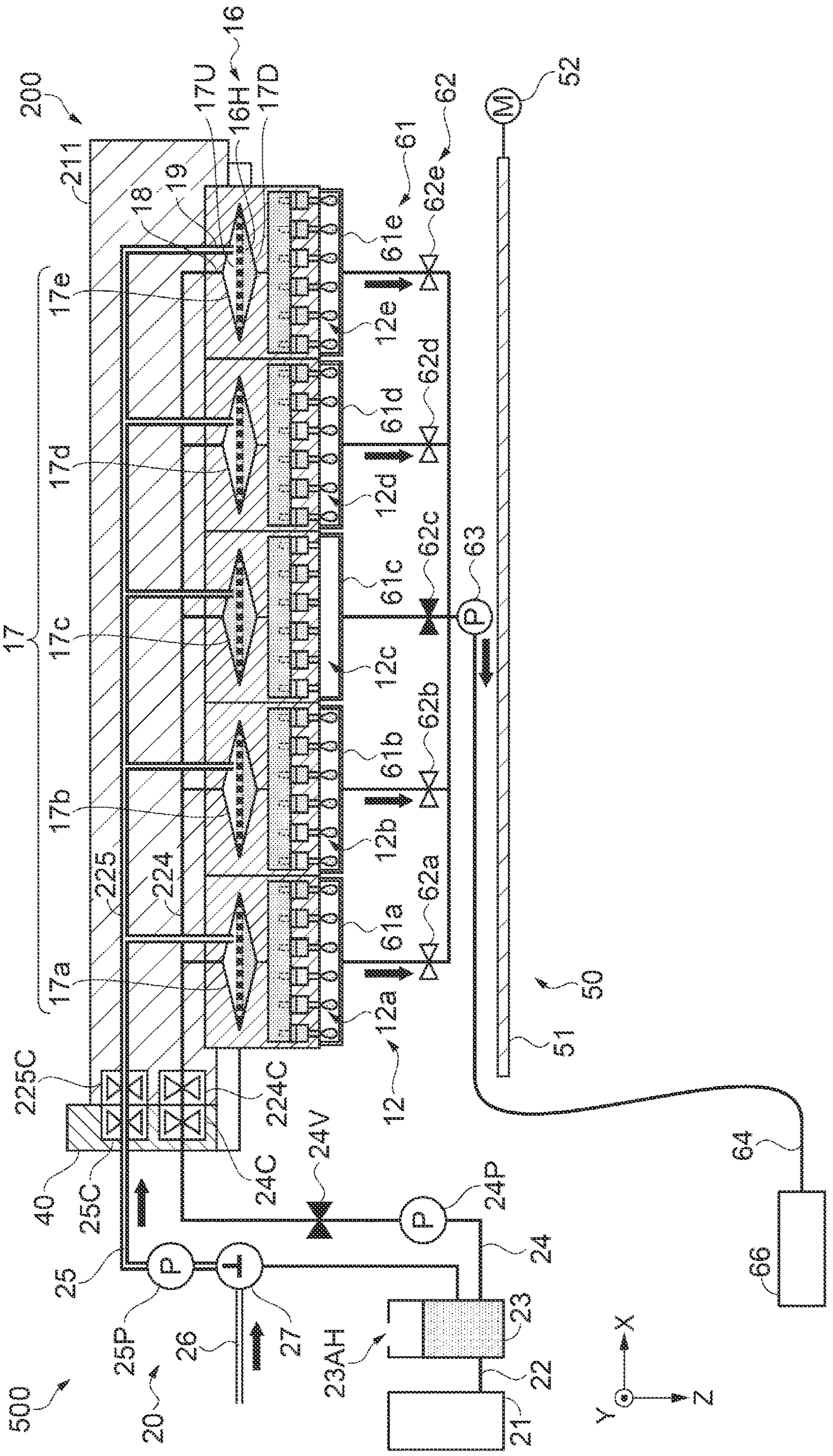
FIG. 6A is a cross sectional view showing a state where a gas is introduced into an upstream chamber of a filter chamber in a pre-operation in Embodiment 2.
Figure 6B:
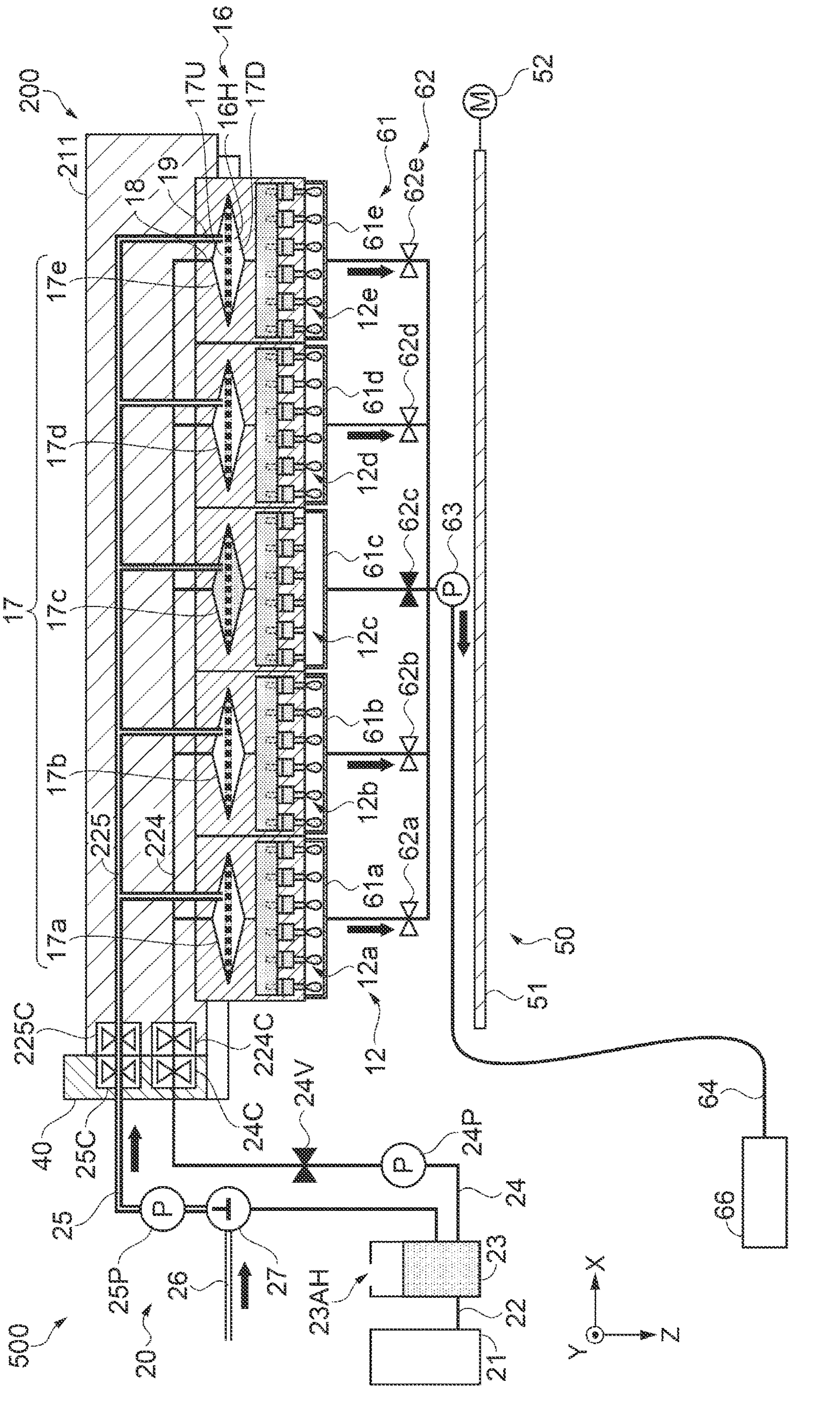
FIG. 6B is a cross sectional view showing a state where the gas is introduced into a downstream chamber of the filter chamber in the pre-operation in Embodiment 2.

In the pre-operation executed by the control unit 90 in Embodiment 1, as shown in FIGS. 5A to 5C, gas-liquid interfaces are formed also in the holes 16H of the filter 16 in the filter chamber 17*c*. On the contrary, as shown in FIGS. 6A and 6B, in a pre-operation, the control unit 90 in the present embodiment forms gas-liquid interfaces in the holes 16H of the filter 16 in the filter chambers 17*a*, 17*b*, 17*d*, and 17*e* but does not form gas-liquid interfaces in the holes 16H of the filter 16 in the filter chamber 17*c*.

Figure 4:
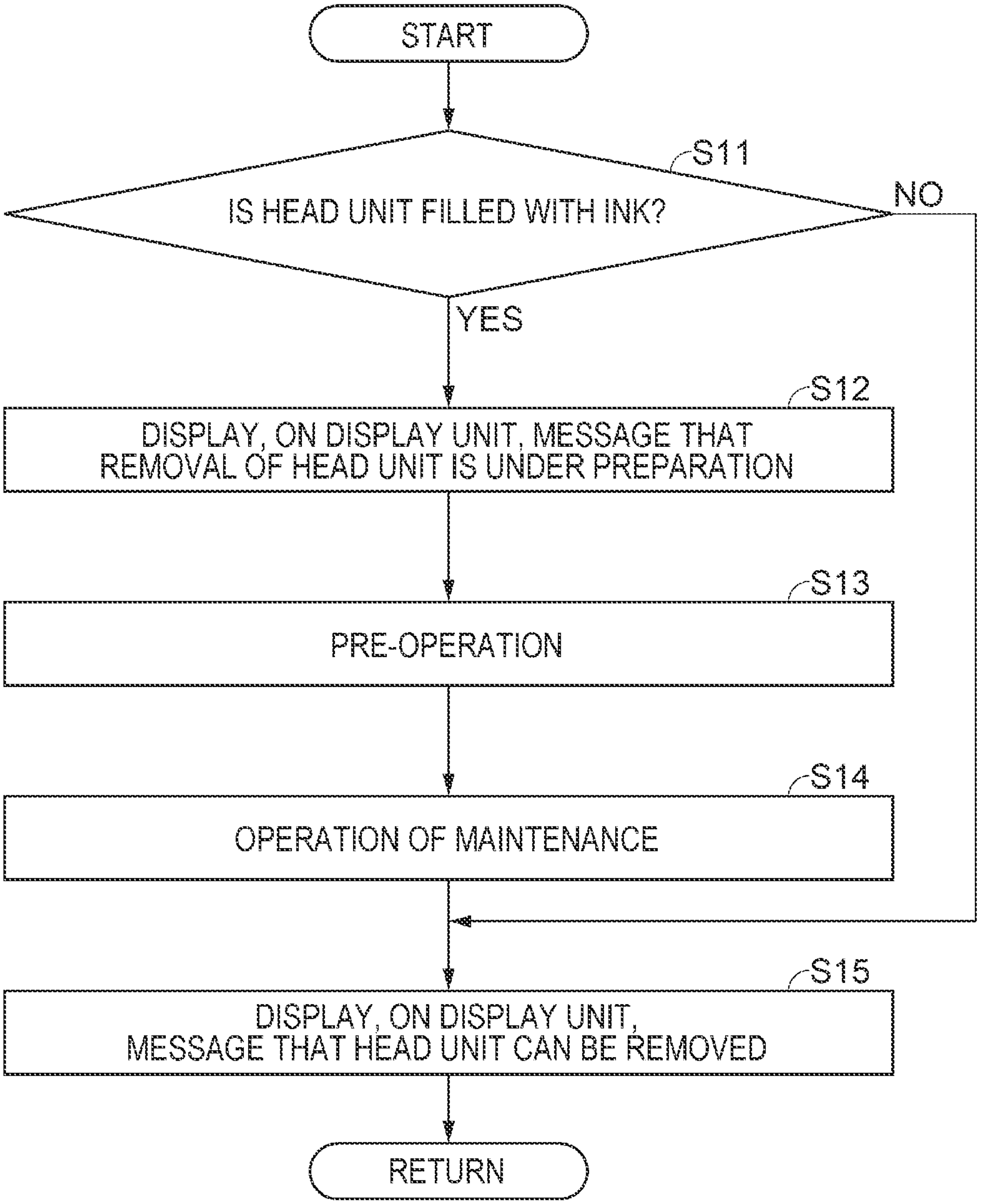
FIG. 4 is a flowchart showing an example of a control method of a liquid ejecting apparatus including a pre-operation.

Next, flow of processing executed when the control unit 90 performs control including the pre-operation will be described in the present embodiment. In the present embodiment, the flow of the processing executed when the control unit 90 performs control including the pre-operation is the same as Embodiment 1 except Step S13 in the flowchart shown in FIG. 4 is different. For this reason, herein, flow of processing in Step S13 in the flowchart shown in FIG. 4 will be described.

In Step S13, the control unit 90 executes the pre-operation. In the pre-operation, the control unit 90 moves the cap 61 to the suctionable position. In addition, the control unit 90 brings the first opening/closing valve 24V into the closed state. In addition, the control unit 90 brings the switching valve 27 into the communication state. In addition, the control unit brings the cap valves 62*a*, 62*b*, 62*d*, and 62*e* into the open state, and brings the cap valve 62*c* into the closed state. Then, the control unit 90 drives the suction pump 63. At this time, the control unit 90 drives the suction pump 63 such that a pressure in downstream chamber 17D of each of the filter chambers 17*a*, 17*b*, 17*d*, and 17*e* is lower than a pressure in the upstream chamber 17U and a pressure difference between the pressure in the downstream chamber 17D and the pressure in the upstream chamber 17U is greater than the withstand pressure Pn. Accordingly, as shown in FIG. 6A, an ink discharged from the nozzles N of the nozzle rows 12*a*, 12*b*, 12*d*, and 12*e* flows toward the waste liquid collecting unit 66, as shown by arrows, via the caps 61*a*, 61*b*, 61*d*, and 61*e* and the waste liquid tube 64.

Along with this, as shown by arrows, the atmosphere flows into the fluid flow path 25, the second common flow path 225, the second filter flow paths 19 communicating with the filter chambers 17*a*, 17*b*, 17*d*, and 17*e*, and the upstream chambers 17U of the filter chambers 17*a*, 17*b*, 17*d*, and 17*e* via the atmospheric passage 26, and an ink in the upstream chambers 17U of the filter chambers 17*a*, 17*b*, 17*d*, and 17*e* is replaced with the atmosphere. Accordingly, a gas-liquid interface is formed on each upstream chamber 17U side of each of the holes 16H of the filters 16 in the filter chambers 17*a*, 17*b*, 17*d*, and 17*e*. On the other hand, since the atmosphere does not flow into the second filter flow path 19 communicating with the filter chamber 17*c* and the filter chamber 17*c*, gas-liquid interfaces are not formed in the holes 16H of the filter 16 in the filter chamber 17*c*.

Once gas-liquid interfaces are formed on the upstream chamber 17U sides of the holes 16H in the filters 16 of the filter chambers 17*a*, 17*b*, 17*d*, and 17*e*, the control unit 90 may terminate the pre-operation, but continues to drive the suction pump 63 when gas-liquid interfaces are formed on both sides of the upstream chamber 17U sides and the downstream chamber 17D sides of the holes 16H in each of the filters 16 of the filter chambers 17*a*, 17*b*, 17*d*, and 17*e*, as shown in FIG. 6B. When it is difficult for the atmosphere to flow into the downstream chambers 17D of the filter chambers 17*a*, 17*b*, 17*d*, and 17*e*, for example, the control unit 90 drives the suction pump 63 such that a pressure in the downstream chamber 17D of each of the filter chambers 17*a*, 17*b*, 17*d*, and 17*e* is lower than a pressure in the upstream chamber 17U and a pressure difference between the pressure in the downstream chamber 17D and the pressure in the upstream chamber 17U is greater than the withstand pressure Pf.

As described hereinbefore, with the liquid ejecting apparatus 500 according to Embodiment 2, the following effects can be obtained.

The head unit 200 has the filter 16, the filter chamber 17*c* including the upstream chamber 17U and the downstream chamber 17D, which are partitioned by the filter 16, and the nozzle row 12*c* having the plurality of nozzles N ejecting an ink supplied via the common flow path 224 communicating with the upstream chamber 17U of the filter chamber 17*c*. The nozzles N forming the nozzle row 12*c* communicate with the nozzles N forming the nozzle row 12*a* via the filter

16 of the filter chamber 17*c*, the common flow path 224, and the filter 16 of the filter chamber 17*a*, and communicates with the nozzles N forming the nozzle row 12*e* via the filter 16 of the filter chamber 17*c*, the common flow path 224, and the filter 16 of the filter chamber 17*e*. When a maximum pressure among pressures of an ink in the head unit 200, which are caused by a height difference between the plurality of nozzles N included in the head unit 200 and act on gas-liquid interfaces formed in the nozzles N of the nozzle row 12*c*, is defined as a pressure Ph2, the control unit 90 does not form gas-liquid interfaces in the holes 16H provided in the filter 16 of the filter chamber 17*c* in the pre-operation in a case where the withstand pressure Pn is greater than the pressure Ph2.

According to this, when the pressure of an ink in the head unit 200, which is caused by a change in the posture of the head unit 200 due to the removal of the head unit 200, acts on gas-liquid interfaces formed in the nozzles N, an ink leakage from the nozzles N can be prevented, and the amount of an ink in the filter chamber 17 replaced with the atmosphere can be decreased.

The liquid ejecting apparatus 500 according to the embodiment of the present disclosure is based on having the configuration described hereinbefore, but it is evident that the configuration can also be partially changed or omitted without departing from the gist of the disclosure of the present application. In addition, the embodiments and other embodiments to be described below can be performed in combination with each other within a technically consistent range. Hereinafter, other embodiments will be described based.

In the pre-operation in Embodiment 2, the control unit 90 may form gas-liquid interfaces in the holes 16H provided in the filter 16 of any one of the filter chambers 17*a*, 17*b*, 17*c*, 17*d*, and 17*e* such that a maximum pressure among pressures of an ink in the head unit 200, which are caused by a height difference between the plurality of nozzles N included in the head unit 200 and act on gas-liquid interfaces formed in the nozzles N, is smaller than the withstand pressure Pn of the gas-liquid interfaces formed in the nozzles N. In the head unit 200 of the embodiment, since the pressure of an ink, which has the dimension Dhc as a water head, is smaller than the withstand pressure Pn of the gas-liquid interfaces formed in the nozzles N, for example, the gas-liquid interfaces are formed in the holes 16H provided in the filters 16 of the filter chambers 17*a* and 17*e*. In this case, in the pre-operation, the control unit 90 brings the first opening/closing valve 24V into the closed state, brings the switching valve 27 into the communication state, brings the cap valves 62*a* and 62*e* into the open state, brings the cap valves 62*b*, 62*c*, and 62*d* into the closed state, and drives the suction pump 63. In the pre-operation, gas-liquid interfaces are not formed in the holes 16H provided in the filters 16 of the filter chambers 17*b*, 17*c*, and 17*d*. In addition, in the head unit 200 of the embodiment, since the pressure of the ink, which has the dimension Dhc as a water head, is smaller than the withstand pressure Pn of the gas-liquid interfaces formed in the nozzles N, for example, gas-liquid interfaces may be formed in the holes 16H provided in the filters 16 of the filter chambers 17*a* and 17*b*, and gas-liquid interfaces may not be formed in the holes 16H provided in the filters 16 of the filter chambers 17*c*, 17*d*, and 17*e*. In addition, for example, gas-liquid interfaces may be formed in the holes 16H provided in the filters 16 of the filter chambers 17*d* and 17*e*, and gas-liquid interfaces may not be formed in the holes 16H provided in the filters 16 of the filter chambers 17*a*, 17*b*, and 17*c*.

In the pre-operation in Embodiment 1, in the communication state, the control unit 90 may bring the first opening/closing valve 24V into the open state, and drive-control any one of the second pump 25P and the first pump 24P such that flows of a fluid in the atmospheric passage 26, the fluid flow path 25, and the liquid flow path 24 are in the directions of the arrows of FIG. 5A.

In the pre-operation in Embodiment 1, in the communication state, the control unit 90 may bring the first opening/closing valve 24V into the closed state, make the atmosphere flow into the filter chamber 17 by drive-controlling the second pump 25P such that flows of a fluid in the atmospheric passage 26 and the fluid flow path 25 are in the directions of the arrows of FIG. 5A, and form gas-liquid interfaces in the holes 16H of the filter 16. In this case, an ink in the filter chamber 17 is discharged from the nozzles N, but the ink can be collected by the cap 61 by moving the cap 61 to the suctionable position as shown in FIG. 5C.

In the embodiment, the liquid ejecting apparatus 500 may be able to make the atmosphere introduced into the filter chamber 17 of the liquid ejecting head 10 via the liquid flow path 24. In this case, for example, the switching valve 27 may be provided at a position between the first pump 24P in the liquid flow path 24 and the liquid storage unit 23, and the atmospheric passage 26 may be coupled to the liquid flow path 24 via the switching valve 27. In addition, in this case, in the pre-operation, the control unit 90 can make the atmosphere from the atmospheric passage 26 introduced into the filter chamber 17 via the liquid flow path 24, the common flow path 224, and the first filter flow path 18 by bringing the switching valve 27 into the communication state, and drives the first pump 24P in a direction in which the atmosphere flows from the atmospheric passage 26 toward the filter chamber 17.

In the embodiment, the liquid ejecting apparatus 500 may include an air tank accommodating the atmosphere introduced into the filter chamber 17. In this case, the atmospheric passage 26 may couple the air tank to the fluid flow path 25 via the switching valve 27.

Figure 7:
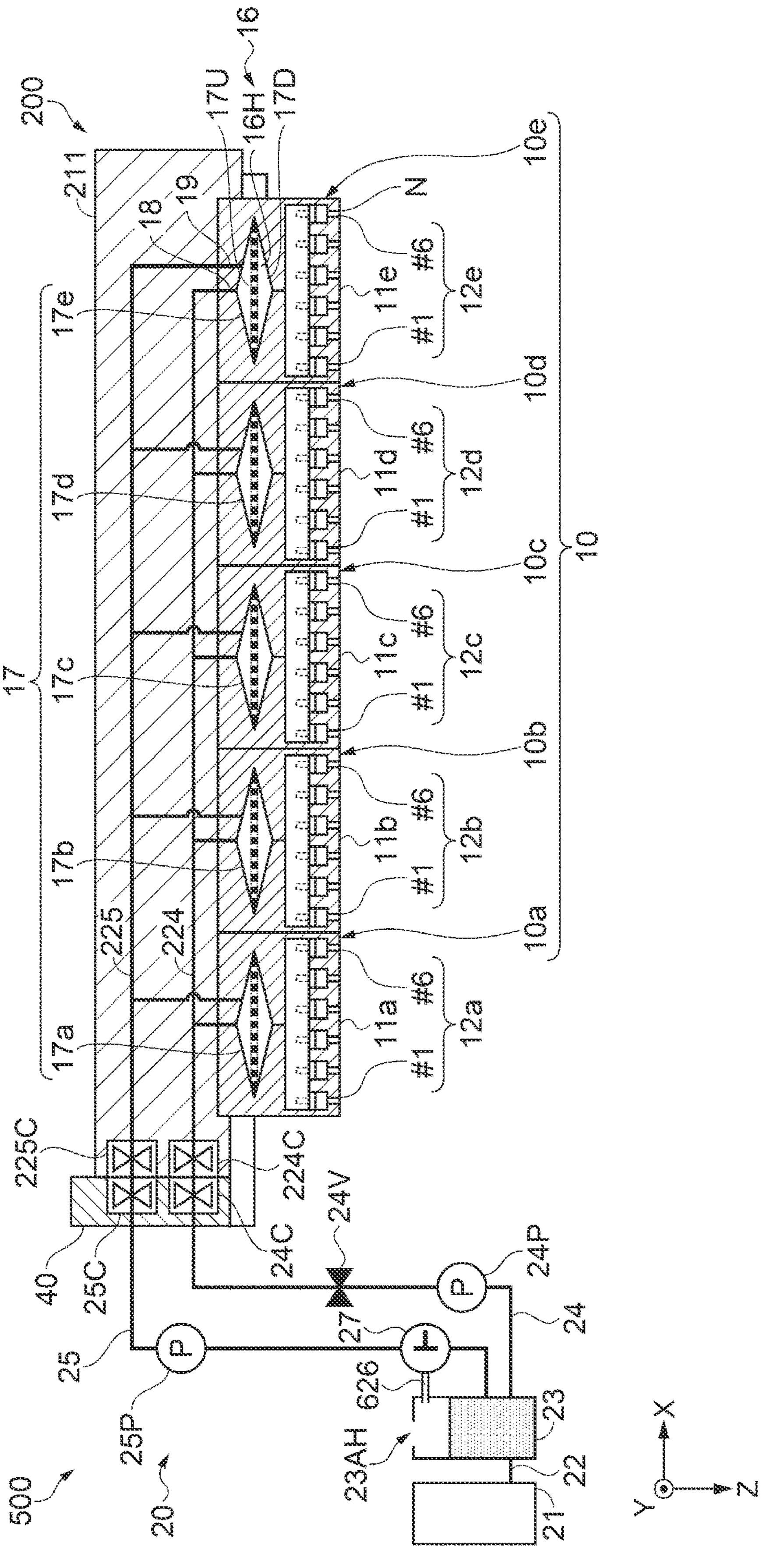
FIG. 7 is a cross sectional view showing a liquid ejecting apparatus according to another embodiment in which a fluid flowing unit is partially changed.

In the embodiment, the liquid ejecting apparatus 500 may be able to make a gas in the liquid storage unit 23 introduced into the filter chamber 17 of the liquid ejecting head 10 by making the fluid flow path 25 communicate with a space above an ink in the liquid storage unit 23. In this case, as shown in FIG. 7, the fluid flowing unit 20 may have a gas passage 626 instead of the atmospheric passage 26.

In the embodiment, the liquid ejecting apparatus 500 may not introduce the atmosphere from the atmospheric passage 26 into the filter chamber 17. For example, by bringing the first opening/closing valve 24V into the open state, bringing the switching valve 27 into the open state, and driving the second pump 25P, an ink in the liquid flow path 24 flows in the supply direction, and in a state where an ink in the fluid flow path 25 flows in the return direction as shown in FIG. 3A, the first opening/closing valve 24V is brought into the closed state. Accordingly, the atmosphere can flow from the nozzles N into the head unit 200, and the atmosphere can be introduced into the filter chamber 17 via the common liquid chamber 13. In this case, the first opening/closing valve 24V functions as the gas introduction unit that can make a gas introduced into the filter chamber 17 of the head unit 200.

Figure 8:
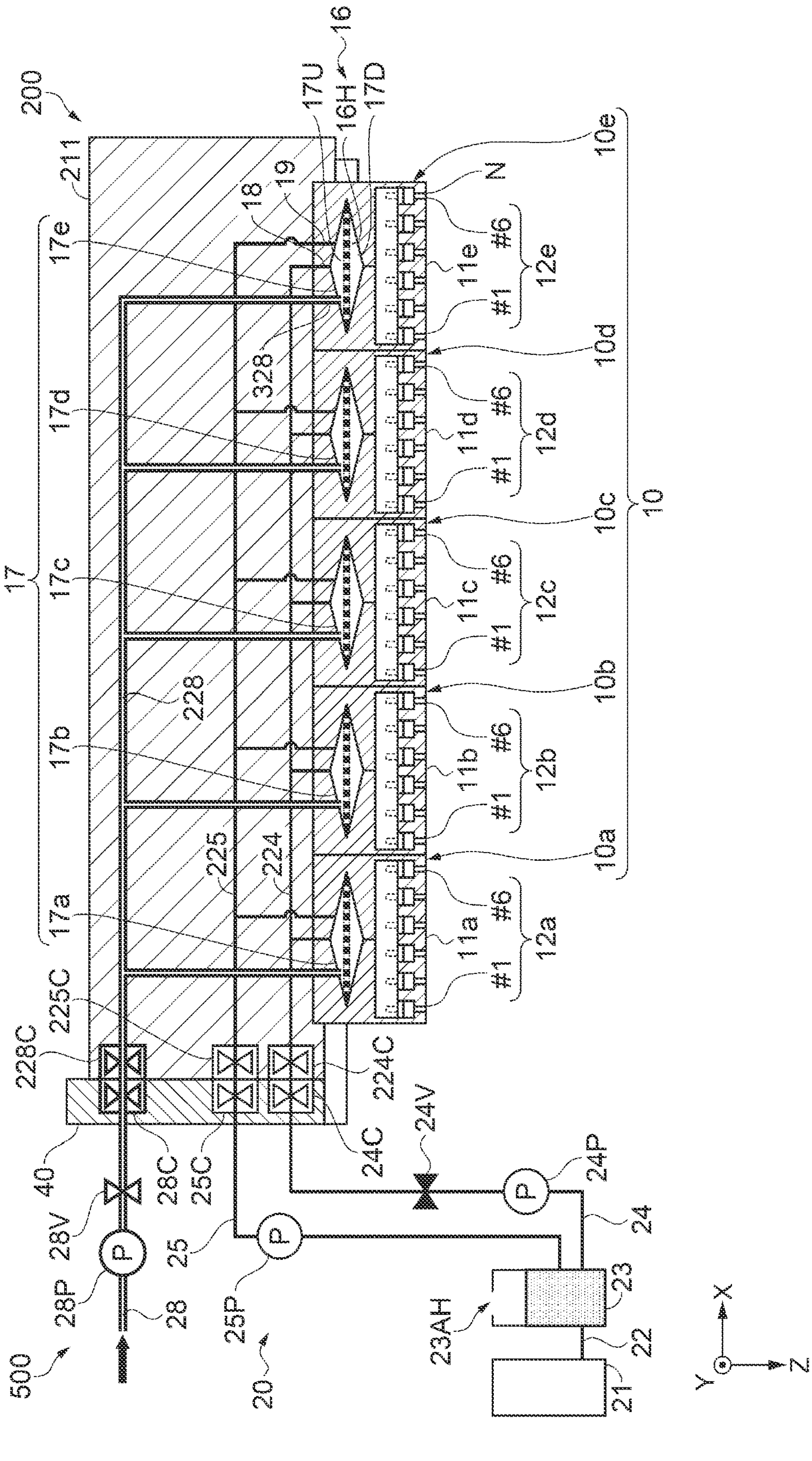
FIG. 8 is a cross sectional view showing a liquid ejecting apparatus according to still another embodiment in which a fluid flowing unit and a head unit are partially changed.

In the embodiment, the liquid ejecting apparatus 500 may not introduce the atmosphere from the atmospheric passage 26 into the filter chamber 17 via the fluid flow path 25, the second common flow path 225, and the second filter flow path 19. In this case, for example, as shown in FIG. 8, the fluid flowing unit 20 has, instead of the atmospheric passage 26 and the switching valve 27, a gas flow path 28, a third pump 28P, a gas flow path opening/closing valve 28V which is an example of the gas introduction unit, and a gas flow path side coupling portion 28C. In the gas flow path side coupling portion 28C, an opening/closing valve that brings the gas flow path 28 into a communication state with a third common flow path 228 as the head unit 200 is mounted on the mounting portion 40, and blocks communication with the outside of the gas flow path side coupling portion 28C as the head unit 200 is removed from the mounting portion 40 is provided. The head unit 200 has, in the flow path portion 211, the third common flow path 228 communicating with a third filter flow path 328 provided in each of the upstream chambers 17U of the filter chambers 17*a*, 17*b*, 17*c*, 17*d*, and 17*e* and a third common flow path side coupling portion 228C. In the third common flow path side coupling portion 228C, an opening/closing valve that brings the third common flow path 228 into a communication state with the gas flow path 28 as the head unit 200 is mounted on the mounting portion 40, and blocks communication with the outside of the third common flow path side coupling portion 228C as the head unit 200 is removed from the mounting portion 40 is provided. In addition, in this case, in the pre-operation, the control unit 90 can make the atmosphere from the gas flow path 28 introduced into the filter chamber 17 via the third common flow path 228 and the third filter flow path 328 by opening the gas flow path opening/closing valve 28V, and drives the third pump 28P. Accordingly, as shown by an arrow in FIG. 8, the atmosphere flows from the gas flow path 28 toward the filter chamber 17.

An opening/closing valve may be provided in each branch flow path of the third common flow path 228 coupled to each of the third filter flow paths 328 provided in the filter chambers 17*a*, 17*b*, 17*c*, 17*d*, and 17*e* such that the atmosphere can selectively flow from the gas flow path 28 shown in FIG. 8 into any one of the filter chambers 17*a*, 17*b*, 17*c*, 17*d*, and 17*e*. Alternatively, the gas flow path 28 where the third pump 28P and the gas flow path opening/closing valve 28V which is an example of the gas introduction unit are provided may be able to be coupled to correspond to each of the third filter flow paths 328 provided in the filter chambers 17*a*, 17*b*, 17*c*, 17*d*, and 17*e*.

In the embodiment, the plurality of nozzles N that communicate with the plurality of common liquid chambers 13 included in the head unit 200 and form the nozzle rows 12*a*, 12*b*, 12*c*, 12*d*, and 12*e* may form a plurality of nozzle rows under a condition that a maximum pressure among pressures of an ink, which are caused by a height difference between the plurality of nozzles N communicating with one common liquid chamber 13 and act on gas-liquid interfaces formed in the nozzles N, is smaller than the withstand pressure Pn of the gas-liquid interfaces formed in the nozzles N. In this case, a plurality of nozzle rows communicating with one common liquid chamber 13 form one nozzle group.

In the embodiment, the nozzle rows 12*a*, 12*b*, 12*c*, 12*d*, and 12*e* included in the head unit 200 may not form a single row of nozzle rows, and for example, the nozzle rows 12*a*, 12*b*, 12*c*, 12*d*, and 12*e* may be disposed in a zigzag pattern.

In the embodiment, the nozzle row 12 formed by arranging the plurality of nozzles N in a single row in the X-axis direction is shown as an example of the nozzle group included in each liquid ejecting head 10 of the head unit 200, but is not limited to this aspect. The nozzle group included in each liquid ejecting head 10 may have other configurations insofar as the nozzle group is configured by the plurality of nozzles N communicating with the downstream chamber 17D without the filter 16 being interposed therebetween. In this case, for example, other configurations of the nozzle group included in each liquid ejecting head 10 may be, for example, a nozzle group configured by arranging, in the X-axis direction, a plurality of nozzle rows formed by arranging the plurality of nozzles N in a single row in a direction intersecting the X-axis direction.

In the embodiment, the head unit 200 may not be a line head. For example, when the head unit 200 forms an image on the printing paper P while moving in the X-axis direction, each of the nozzle rows 12*a*, 12*b*, 12*c*, 12*d*, and 12*e* included in the head unit 200 may follow the Y-axis direction, and the nozzle rows 12*a*, 12*b*, 12*c*, 12*d*, and 12*e* may be disposed at intervals in the X-axis direction.

What is claimed is:

1. A liquid ejecting apparatus comprising:

a head unit having a plurality of nozzles ejecting a liquid, a filter provided with a hole through which the liquid is configured to pass, a filter chamber including an upstream chamber and a downstream chamber, which are partitioned by the filter, a first nozzle group formed by a plurality of the nozzles, and a second nozzle group formed by a plurality of the nozzles;

a mounting portion on which the head unit is detachably mounted;

a gas introduction unit configured to introduce a gas into the filter chamber; and a control unit, wherein the nozzles forming the second nozzle group communicate with the nozzles forming the first nozzle group via the filter of the filter chamber, when a pressure difference between a pressure on a gas side and a pressure on a liquid side, at which a gas-liquid interface formed in the hole of the filter is able to be maintained, is defined as a withstand pressure Pf and a pressure difference between a pressure on the gas side and a pressure on the liquid side, at which a gas-liquid interface formed in the nozzle is able to be maintained, is defined as a withstand pressure Pn, the withstand pressure Pf is greater than the withstand pressure Pn, and the control unit executes, before the head unit is removed from the mounting portion, a pre-operation of forming the gas-liquid interface in the hole provided in the filter by controlling the gas introduction unit and introducing the gas into the filter chamber.

2. The liquid ejecting apparatus according to claim 1, wherein when a maximum pressure, among pressures of the liquid in the head unit which are caused by a height difference between the plurality of nozzles included in the head unit and act on the gas-liquid interface formed in the nozzle, is defined as a pressure Ph1, the withstand pressure Pf is greater than the pressure Ph1.

3. The liquid ejecting apparatus according to claim 2, further comprising:

a liquid storage unit storing the liquid;

a first passage configured to make the upstream chamber and the liquid storage unit communicate with each other;

a second passage configured to make the liquid storage unit and the upstream chamber communicate with each other;

an atmospheric passage communicating with the second passage;

a switching valve that is the gas introduction unit configured to switch the atmospheric passage between a communication state where the atmospheric passage communicates with the second passage and a non-communication state where the atmospheric passage does not communicate with the second passage; and an introduction pump provided in the second passage, wherein the control unit executes the pre-operation of controlling the switching valve such that the atmospheric passage is brought into the communication state, introducing the gas from the atmospheric passage into the upstream chamber via the second passage by driving the introduction pump, and forming the gas-liquid interface in the hole of the filter by returning the liquid in the upstream chamber to the liquid storage unit via the first passage.

4. The liquid ejecting apparatus according to claim 3, wherein the control unit drives the introduction pump such that a pressure in the upstream chamber is higher than a pressure in the downstream chamber and a pressure difference between the pressure in the upstream chamber and the pressure in the downstream chamber is greater than the withstand pressure Pf.

5. The liquid ejecting apparatus according to claim 1, further comprising:

a liquid storage unit storing the liquid;

a first passage configured to make the upstream chamber and the liquid storage unit communicate with each other;

a second passage configured to make the liquid storage unit and the upstream chamber communicate with each other;

an atmospheric passage communicating with the second passage;

a switching valve that is the gas introduction unit configured to switch the atmospheric passage between a communication state where the atmospheric passage communicates with the second passage and a non-communication state where the atmospheric passage does not communicate with the second passage; and an introduction pump provided in the second passage, wherein the control unit executes the pre-operation of controlling the switching valve such that the atmospheric passage is brought into the communication state, introducing the gas from the atmospheric passage into the upstream chamber via the second passage by driving the introduction pump, and forming the gas-liquid interface in the hole of the filter by returning the liquid in the upstream chamber to the liquid storage unit via the first passage.

6. The liquid ejecting apparatus according to claim 5, wherein the control unit drives the introduction pump such that a pressure in the upstream chamber is higher than a pressure in the downstream chamber and a pressure difference between the pressure in the upstream chamber and the pressure in the downstream chamber is greater than the withstand pressure Pf.

7. The liquid ejecting apparatus according to claim 1, wherein when the filter chamber is defined as a first filter chamber, the upstream chamber is defined as a first upstream chamber, and the downstream chamber is defined as a first downstream chamber, the head unit has the filter, a second filter chamber including a second upstream chamber and a second downstream chamber, which are partitioned by the filter, and a common flow path communicating with the first upstream chamber and the second upstream chamber, the plurality of nozzles forming the first nozzle group and the plurality of nozzles forming the second nozzle group eject the liquid supplied via the common flow path, and the nozzles forming the second nozzle group communicate with the nozzles forming the first nozzle group via the filter of the second filter chamber, the common flow path, and the filter of the first filter chamber, the gas introduction unit is configured to introduce the gas into the first filter chamber and the second filter chamber, and the control unit forms the gas-liquid interfaces in the hole provided in the filter of the first filter chamber and the hole provided in the filter of the second filter chamber by introducing the gas into the first filter chamber and the second filter chamber in the pre-operation.

8. The liquid ejecting apparatus according to claim 7, wherein the head unit has the filter, a third filter chamber including a third upstream chamber and a third downstream chamber, which are partitioned by the filter, and a third nozzle group having the plurality of nozzles ejecting the liquid supplied via the common flow path communicating with the third upstream chamber, the nozzles forming the third nozzle group communicate with the nozzles forming the first nozzle group via the filter of the third filter chamber, the common flow path, and the filter of the first filter chamber, and communicate with the nozzles forming the second nozzle group via the filter of the third filter chamber, the common flow path, and the filter of the second filter chamber, and when a maximum pressure, among pressures of the liquid in the head unit which are caused by a height difference between the plurality of nozzles included in the head unit and act on the gas-liquid interface formed in the nozzle of the third nozzle group, is defined as a pressure Ph2, the control unit does not form the gas-liquid interface in the hole provided in the filter of the third filter chamber in the pre-operation in a case where the withstand pressure Pn is greater than the pressure Ph2.

* * * * *